United States Patent
Shiraishi et al.

(10) Patent No.: US 7,384,451 B2
(45) Date of Patent: Jun. 10, 2008

(54) GAS-LIQUID SEPARATION METHOD AND UNIT

(75) Inventors: Fumiko Shiraishi, Minami-Ashigara (JP); Yasunori Ichikawa, Minami-Ashigara (JP); Seiji Sugiyama, Minami-Ashigara (JP); Koukichi Waki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 251 days.

(21) Appl. No.: 10/975,371

(22) Filed: Oct. 29, 2004

(65) Prior Publication Data

US 2005/0109211 A1 May 26, 2005

(30) Foreign Application Priority Data

Oct. 29, 2003 (JP) .............................. 2003-368896

(51) Int. Cl.
*B01D 19/00* (2006.01)
(52) U.S. Cl. .............................. 95/19; 95/260; 95/266; 96/174; 96/194; 96/206; 75/348
(58) Field of Classification Search ............... 95/19, 95/241, 260, 266; 96/155, 174, 193, 194, 96/206; 75/348, 351, 370
See application file for complete search history.

(56) References Cited

U.S. PATENT DOCUMENTS

| | | | | |
|---|---|---|---|---|
| 2,376,221 A | * | 5/1945 | Baker | ............................. 95/30 |
| 2,749,234 A | * | 6/1956 | Eisenberg | ..................... 75/354 |
| 4,141,857 A | | 2/1979 | Levy et al. | |
| 4,415,663 A | | 11/1983 | Symon et al. | |
| 5,490,874 A | * | 2/1996 | Kuster et al. | ................. 96/204 |
| 5,541,097 A | | 7/1996 | Lantero et al. | |
| 5,639,930 A | | 6/1997 | Penick | |

FOREIGN PATENT DOCUMENTS

| | | | |
|---|---|---|---|
| DE | 108 310 A | | 9/1974 |
| GB | 2117662 A | * | 10/1983 |
| JP | 7-253272 A | | 10/1995 |
| JP | 11-281637 A | | 10/1999 |
| JP | 11-333236 A | | 12/1999 |

(Continued)

OTHER PUBLICATIONS

Mateo Cesar et al., "Reversible enzyme immobilization via a very strong and nondistorting ionic adsorption on support-polyethylenimine composites", Biotechnology and Bioengineering, vol. 68, No. 1, Apr. 5, 2000, pp. 98-105, XP0002313072.

(Continued)

*Primary Examiner*—Duane Smith
*Assistant Examiner*—Douglas J Theisen
(74) *Attorney, Agent, or Firm*—Sughrue Mion, PLLC

(57) ABSTRACT

When a reaction liquid is passed through a gas-liquid separation pipe having a larger volume per unit length than the volume per unit length of a pipe, a headspace part into which gas can be released is formed above the gas-liquid separation pipe, and the byproduct gas generated by the reaction changes into bubbles, moves upward in the reaction liquid, and is continuously released from a gas-liquid interface into the headspace part. While the gas is removed in the gas-liquid separation pipe, the pressure of the headspace part is controlled so as to be constant by a pressure adjustment device.

20 Claims, 19 Drawing Sheets

FOREIGN PATENT DOCUMENTS

| | | |
|---|---|---|
| JP | 2001-113115 A | 4/2001 |
| JP | 2002-52325 A | 2/2002 |
| JP | 2002-529228 A | 9/2002 |
| JP | 2002-529233 A | 9/2002 |
| WO | WO 99/04088 A1 | 1/1999 |

OTHER PUBLICATIONS

Bhosale S H et al:, "Molecular and industrial aspects of glucose isomerase", Microbiological Reviews. Jun. 1996, vol. 60, No. 2, Jun. 1996, pp. 280-300, XP002313073.

* cited by examiner

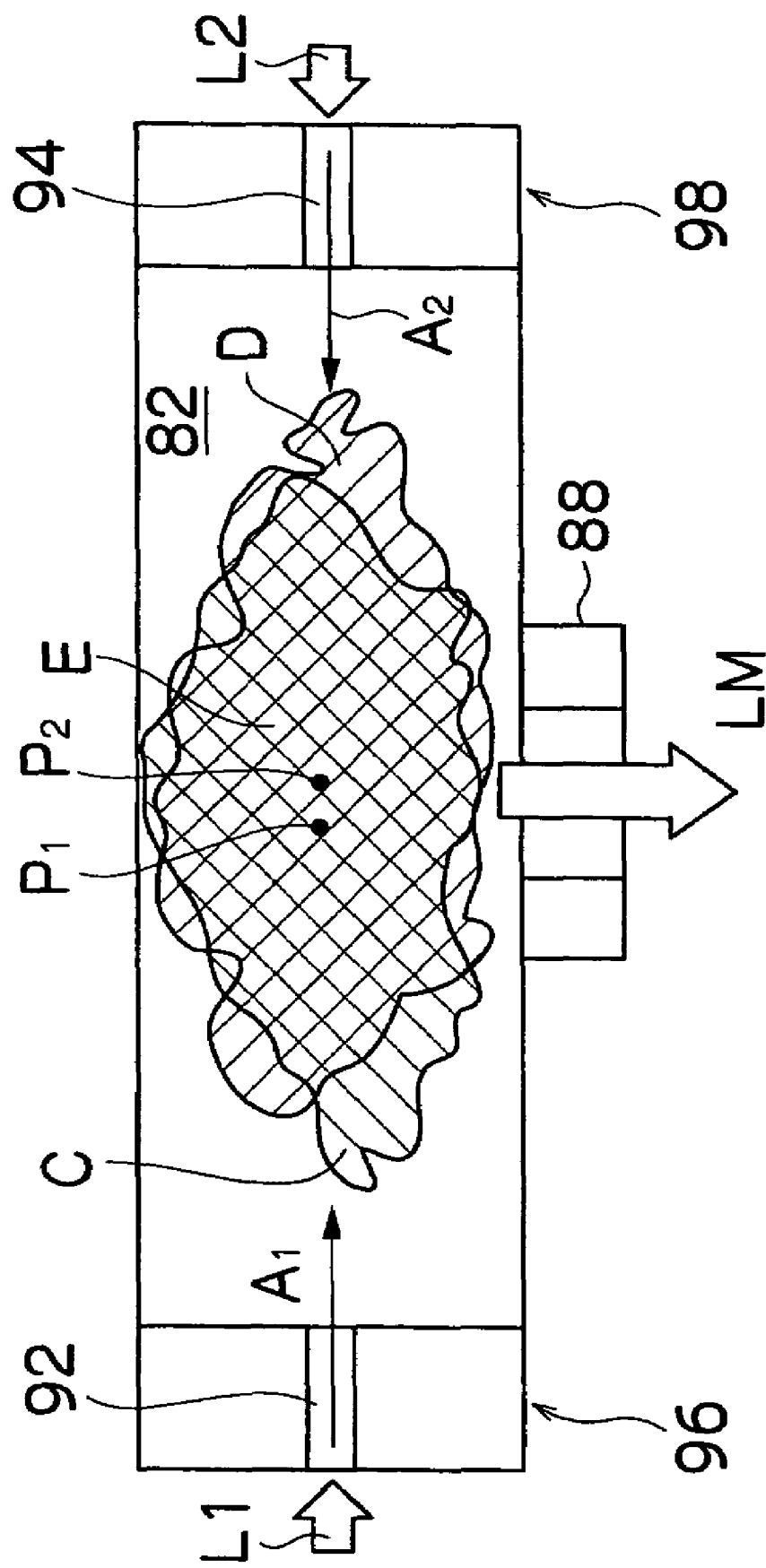

GAS-LIQUID SEPARATION METHOD AND UNIT

BACKGROUND OF THE INVENTION

1. Field of the Invention

The present invention relates to a gas-liquid separation method and unit, and particularly relates to a gas-liquid separation method and unit suitable for removing a byproduct gas generated in a reaction for forming metal microparticles with a continuous production process of the metal microparticles.

2. Description of the Related Art

Magnetic particles contained in a magnetic layer constituting a magnetic recording medium have preferably small particle sizes and superior monodispersibility from the viewpoint of the quality. In producing the metal microparticles, a reaction for forming the metal microparticles is occasionally accompanied by the generation of a byproduct gas (for instance, hydrogen gas).

The reaction accompanied by the byproduct gas is so hardly continued that a continuous processing apparatus for continuously producing the above described metal microparticles has not yet practically been realized. That is because 1 mol of a byproduct gas produces the byproduct gas expanded to as large a volume as 22.4 l, and in the case of continuous treatment, unless the byproduct gas can be effectively removed in the flow of the continuous treatment, it causes various detrimental effects. For instance, if the byproduct gas can not be effectively removed in the flow of the continuous treatment, the flow of the continuous treatment becomes unstable to make a mixing field and a reaction field nonuniform, and thereby to make the equilibrium of the reaction hardly proceed to a reaction-accelerating direction. In addition, when a temperature of a solution is controlled for the reaction, if the byproduct gas can not be effectively removed in the flow of the continuous treatment, the reaction temperature can not be accurately controlled, because gas has a low coefficient of thermal conductivity. As a result of the detrimental effects, there arise such problems that the produced metal microparticles increase in particle sizes, and that the monodispersibility gets worse.

There are various general methods for separating and removing gas from liquid. The typical ones include a degassing method with a separating film (for instance, Japanese Patent Application Publication No. 11-333236, Japanese Patent Application Publication No. 7-253272 and Japanese Patent Application Publication No. 2002-52325); a degassing method by using an adsorbent having gas absorptiveness (for instance, Japanese Patent Application Publication No. 2001-113115); a degassing method by decompression; a degassing method by heating; and a degassing method by mechanical methods such as a cyclone method and a trapping method (for instance, Japanese Publication of International Patent Application No. 2002-529228, Japanese Publication of International Patent Application No. 2002-529233 and Japanese Patent Application Publication No. 11-281637).

SUMMARY OF THE INVENTION

When a degassing method with a separating film is to be employed, such various durabilities are required to the film materials, as durability to a reactive raw material, durability to a product produced by a reaction, and durability to a solvent for dissolving a raw material. However, there is a problem that such a film material as to satisfy them does not exist. Accordingly, the degassing method with the separating film has no problem in the case of treating a gas and a liquid having low reactivity such as in degassing of dissolved oxygen in water, but can not be applied to degassing for a byproduct gas generated by a reaction.

A degassing method utilizing adsorption has many restrictions in chemical resistance and solvent resistance of an adsorbent, as in the case of a separating film, and has a further problem that, in order to speed up the adsorption, incidental facilities such as a compression device are necessary, which make the apparatus complicated.

A degassing method using decompression can remove gas through a decompressing operation, but when a raw material, a solvent and a reaction product are volatile, the degassing method can not be used, because they also volatilize by decompression. When the method is still used, the method needs an operation of separating the raw material, the solvent and the reaction product which have volatilized together with the gas, in a later step of degassing treatment, and thus causes a problem of making the apparatus complicated.

A degassing method using heat can remove gas by a heating operation, as in the case of the method using decompression. However, when a raw material, a solvent and a reaction product are volatile, there is a problem that these also volatilize together with the gas by heat.

A conventional mechanical degassing method is based on the premise that the object does not continuously generate gas as in the case of gas separation from a mixture of a solid and a gas, and the case of removing a dissolved gas in a liquid, and does not consider continuous separation of a gas which continuously generates depending on a proceeding condition of a reaction, as in the case of a byproduct gas generated by the reaction. Accordingly, even if the conventional mechanical degassing method is simply applied to continuous treatment for metal microparticles as a gas-liquid separation unit, the metal microparticles having small particle sizes and adequate monodispersibility can not be produced.

As described above, a conventional degassing method has not been applied for removing a gas which is rapidly generated by a reaction in a large quantity. Because of this, conventionally, the production of metal microparticles accompanied by the generation of a byproduct gas cannot help being performed by so-called a batch system which sequentially carries out each step in one tank. As a result of this, there are problems that the sizes of metal microparticles are hardly micrified, the dispersibility of the produced metal microparticles varies depending on the batch, and thereby the metal microparticles of a constant quality can not be stably produced.

In such a background, a gas-liquid separation method and unit is required, which removes a byproduct gas evolving along with a reaction without destabilizing the flow of a reaction liquid. Such a gas-liquid separation unit for satisfying the requirement is extremely useful, because of enabling continuous production of the above described metal microparticle as well as improving the particle sizes and the monodispersibility of the produced metal microparticles.

The present invention is designed with respect to the above conditions and is directed at providing a gas-liquid separation method for removing a byproduct gas generated by a reaction, without destabilizing the flow of a reaction liquid, and a gas-liquid separation unit therefor.

The first aspect according to the present invention is a gas-liquid separation method for achieving the above described object and for continuously removing a byproduct gas generated by a reaction from a reaction liquid, comprises: providing a gas-liquid separation structure on the way of a pipe for passing through the reaction liquid, the gas-liquid separation structure having a larger space than the pipe in terms of a volume per unit length; floatating the byproduct gas contained in the reaction liquid into a headspace part above a gas-liquid interface to separate the byproduct gas, the headspace part being formed when the reaction liquid passes through the gas-liquid separation structure; and controlling the pressure of the headspace part so that the pressure of the headspace part can be constant.

According to the first aspect, because a reaction liquid is passed so as to flow through a gas-liquid separation structure having a larger space than the pipe in terms of a volume per unit length, a gas-liquid interface is formed in the gas liquid separation structure and a headspace part into which a gas can be released, is formed above the gas-liquid interface. Thereby, a byproduct gas generated by a reaction rises through the reaction liquid in a bubble form, and is continuously released from the gas-liquid interface into the headspace part. The gas-liquid separation structure preferably has enough length in a flow direction of the reaction liquid, for the bubbles generated in the bottom part of the gas-liquid separation structure when the reaction liquid flows into the gas-liquid separation structure, to rise to the surface and be released into the headspace part before the reaction liquid flows out from the gas-liquid separation structure.

A released byproduct gas raises a pressure in a headspace part and presses a gas-liquid interface down. When the byproduct gas accumulated in the headspace part is exhausted, the pressure of the headspace part is reduced and the gas-liquid interface rises. The fluctuation of the pressure in the headspace part makes the flow of a reaction liquid unstable and consequently a reaction nonuniform, in the pipes in front and in the rear of the gas-liquid separation structure. In consideration of the fact, in the first aspect, the pressure of the headspace part is controlled so that the pressure of the headspace part can be constant. Accordingly, even if the byproduct gas is continuously exhausted from the gas-liquid separation structure, the flow of the reaction liquid does not become unstable in the pipes in front and in the rear of the gas liquid separation structure. In order to make the pressure of the headspace part constant, it is preferable to use a pressure adjustment device according to the seventh or eighth aspect which will be described later.

In the second aspect according to the present invention, the pressure of the headspace part in the first aspect is controlled so that the cross sectional area of the reaction liquid flowing through the gas-liquid separation structure can be substantially equal to the cross sectional area of the reaction liquid flowing through the pipe. Thereby, even though the reaction liquid flows into or out the gas-liquid separation structure, the flow of the reaction liquid can be stabilized.

In the third aspect according to the present invention, air in the gas-liquid separation method in the first or second aspect, is previously purged by an inert gas. This is not limited to the case in which a reaction is anaerobic or the case in which a generated byproduct gas is dangerous in the presence of oxygen, such as a hydrogen gas. By previously purging air in the gas-liquid separation structure with the inert gas and raising the pressure in the gas-liquid separation structure, and then by passing a reaction liquid, a gas-liquid interface formed in the gas-liquid separation structure can be controlled to an appropriate position from the beginning.

The appropriate position means, for instance, the position where the cross-sectional area of the reaction liquid flowing through a pipe is approximately equal to the cross-sectional area of the reaction liquid flowing through the gas-liquid separation structure.

In the fourth aspect according to the present invention, the reaction of generating the byproduct gas in any one of the first to the third aspect, is a reaction for forming metal microparticles by mixing a first solution containing a reducing agent with a second solution containing two or more metal ions selected from the group consisting of families 8, 9 and 10 in the periodic table.

This is an example of a reaction suitable for applying a gas-liquid separation method according to the present invention. A reaction caused by mixing first and the second solutions generates hydrogen gas as a byproduct gas with proceeding of the reaction. If the present invention is applied to such a reaction, the gas can be continuously removed in a gas-liquid separation unit installed on the way of the pipe in which the reaction proceeds, without destabilizing the flow of a reaction liquid.

In the fifth aspect according to the present invention, a gas-liquid separation unit for achieving the above described object and for continuously removing a byproduct gas generated by a reaction from a reaction liquid, comprises: a gas-liquid separation structure connected to the midway of a pipe for passing through the reaction liquid, the gas-liquid separation structure having a larger space than the pipe in terms of a volume per unit length and having a gas-liquid interface that is formed when the reaction liquid passes through the space; and a pressure adjustment device for adjusting the pressure of a headspace part above the gas-liquid interface, wherein the byproduct gas contained in the reaction liquid is floatated into a headspace part and continuously separated from the reaction liquid, while the reaction liquid passes through the gas-liquid separation structure.

The fifth aspect constitutes the present invention as a unit.

In the sixth aspect according to the present invention, the gas-liquid separation structure in the fifth aspect has 1.5 times or larger volume per unit length than the volume per unit length of the pipe connected to the gas-liquid separation structure. This is because if the volume per unit length of the gas-liquid separation structure is less than 1.5 times of the volume in the pipe per same unit length, a byproduct gas is hardly floatated from a reaction liquid, since the volume of the formed headspace part is not thoroughly secured. Accordingly, it is recommended to design the gas-liquid separation structure not so as to become too big by itself, while satisfying the volume of 1.5 times or more.

In the seventh aspect according to the present invention, the pressure adjustment device in the fifth or sixth aspect comprises a pressure sensor for measuring the pressure of the headspace part, a vent pipe with a valve for exhausting the byproduct gas accumulated in the headspace part, and a control part for opening and closing the valve on the basis of a measured value by the pressure sensor, where the valve is opened or closed at a response speed of 10 milliseconds or shorter. The seventh aspect shows the configuration of the pressure adjustment device suitable for controlling the pressure of the headspace part so as to make the pressure of the headspace part constant, where such a valve as to open or close at the response speed of 10 milliseconds or shorter is installed in the vent of the pressure adjustment device. Thereby, the pressure of the headspace part can be controlled with high accuracy, and even if the byproduct gas is continuously exhausted from a gas-liquid separation structure, the flow of a reaction liquid does not become unstable in the pipes in front and in the rear of the gas-liquid separation structure. The further preferable response speed of a valve is 5 milliseconds or shorter.

In the eighth aspect according to the present invention, the pressure adjustment device in the fifth or sixth aspect comprises a pressure sensor for measuring the pressure of the headspace part, a vent pipe with a valve for exhausting the byproduct gas accumulated in the headspace part, and a control part for opening and closing the valve on the basis of measured values by the pressure sensor, where the vent pipe has a resistor for decreasing a discharge rate of the byproduct gas, the resistor being installed in the vent pipe. The eighth aspect shows another aspect of a pressure adjustment device suitable for controlling the pressure of the headspace part so as to make the pressure of the headspace part kept constant at a predetermined pressure, and in the aspect the pressure adjustment device further has a resistor for decreasing a discharge rate of the above described byproduct gas, installed in the vent pipe. For the resistor, an orifice or a filter can be used. Thereby, the control for the pressure of the headspace part becomes easy and the pressure of the headspace part can be controlled with high accuracy. As a result, even if the byproduct gas is continuously exhausted from a gas-liquid separation structure, the flow of a reaction liquid does not become unstable in the pipes in front and in the rear of the gas-liquid separation structure.

In addition, a pressure adjustment device may have both of such a valve as to open and close at a response speed of 10 milliseconds or shorter, and the above described resistor.

In the ninth aspect according to the present invention, the gas-liquid separation structure in any one of the fifth to the eighth aspects has a purging device for purging air with an inert gas. This is effective for, as is described in the third aspect, the case in which a reaction is anaerobic, the case in which a byproduct gas is dangerous in the presence of oxygen, like hydrogen gas, and the case in which a gas-liquid interface formed in the gas-liquid separation structure is controlled into an appropriate position from the beginning.

As described above, a gas-liquid separation method and unit according to the present invention, can remove a byproduct gas generated by a reaction without destabilizing the flow of a reaction liquid; thereby enables such a continuous production of metal microparticles as to simultaneously generate a byproduct gas; and besides stably produces metal microparticles having small particle sizes, preferable monodispersibility and a constant quality.

If metal microparticles are contained in a magnetic layer of a magnetic recording medium, the method and the unit can consequently improve the quality of the magnetic recording medium.

In the present invention, the term "microparticles" means particles containing nanoparticles. That is, size of "microparticles" is from nano-size to micro-size.

BRIEF DESCRIPTION OF THE DRAWINGS

FIG. 20 is an explanatory drawing for explaining a mixture theory in a high-pressure mixing method of a two counter-jets type.

DETAILED DESCRIPTION OF THE PREFERRED EMBODIMENTS

Referring to the accompanying drawings, preferred embodiments of the method and the unit for separating a gas and a liquid in relation to the present invention will be now described in detail below.

Figure 1:
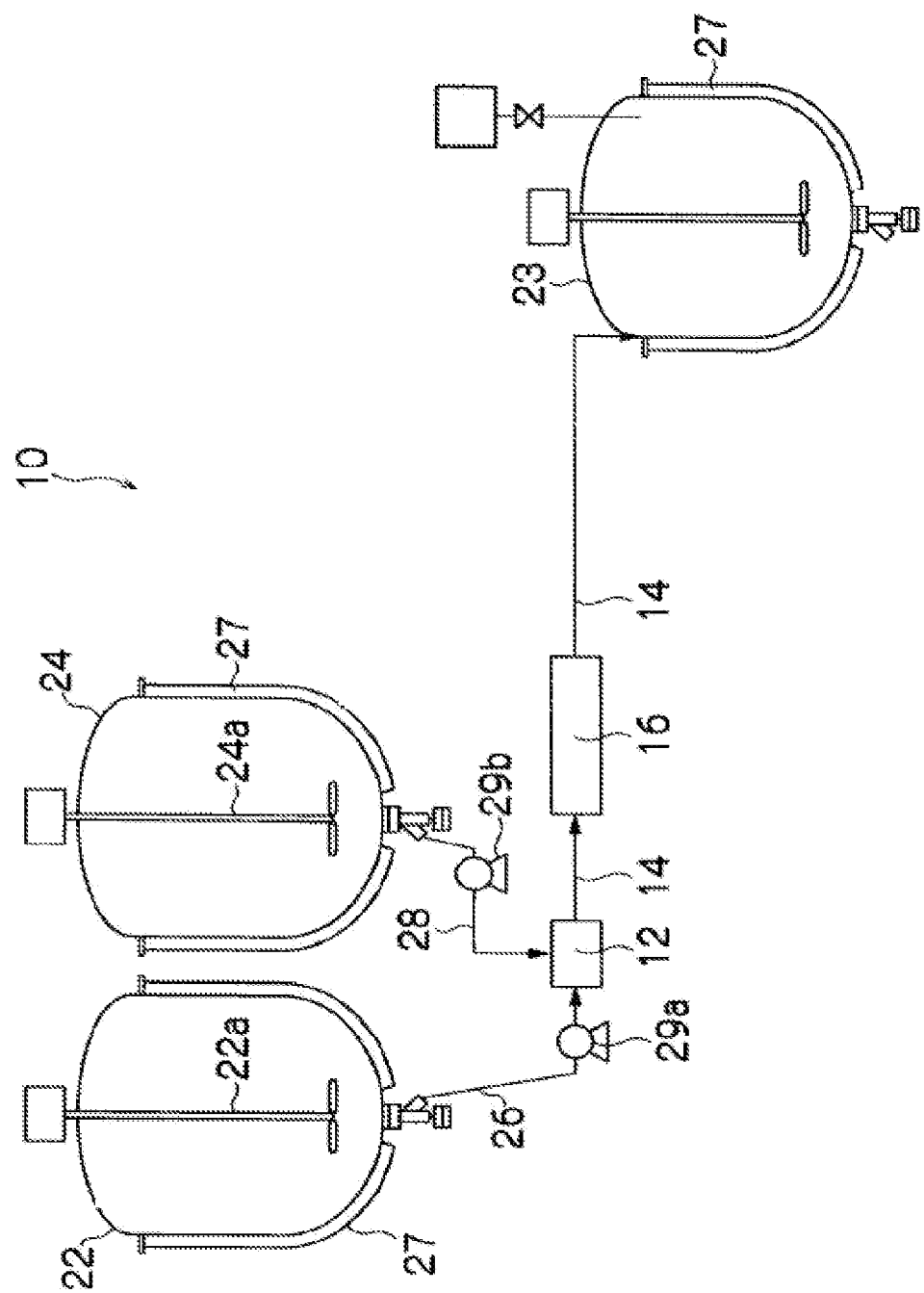
FIG. 1 is a conceptual drawing showing a configuration of a continuous apparatus for producing metal microparticles, which incorporates a gas-liquid separation unit according to the present invention.

FIG. 1 shows one example in which a gas-liquid separation device according to the present invention is incorporated in a continuous production apparatus for continuously producing metal microparticles.

As is shown in FIG. 1, a continuous production apparatus 10 for metal microparticles mainly comprises a mixing unit 12 for continuously supplying and mixing first and second solutions for carrying out a reaction accompanied by the generation of a byproduct gas; a recovery tank 23 for recovering a reaction liquid containing the metal microparticles generated by the above described reaction; and a gas-liquid separation unit 16 for continuously removing a byproduct gas generated with the proceeding of the reaction, which is installed on the way of a pipe 14 for connecting the mixing unit 12 with the recovery tank.

The continuously production apparatus 10 for metal microparticles having the above described configuration, is applicable to any reaction of continuously generating a byproduct gas with proceeding of a reaction in a liquid-phase reaction method (liquid-liquid reaction), but is preferably used for continuously producing, for example, metal microparticles contained in a magnetic layer of a magnetic recording medium, so that embodiments will be described with reference to the example hereafter.

For a first solution L1, a reducing agent solution can be preferably used. For a second solution L2, a solution containing two or more metal ions selected from the group consisting of families 8, 9 and 10 in the periodic table is preferably used. In other words, the metal ions of Fe, Pt, Co, Ni and Pd are preferable.

As for the method of preparing a solution, a reversed micelle method is preferable among liquid-phase reaction methods, which can easily control the particle sizes of metal microparticles, and thus first and second solutions L1 and L2 are preferably prepared into reversed micelle solutions by using a water-insoluble organic solvent containing a surface active agent. As for the surface active agent, an oil-soluble surface active agent is used. The oil-soluble surface active agent specifically includes a sulfonate type (for instance, aerosol OT (made by Wako Pure Chemical Industries, Ltd.)), a quaternary ammonium salt-type (for instance, cetyltrimethylammonium bromide), and an ether type (for instance, pentaethyleneglycol dodecylether). In addition the water-insoluble organic solvent for dissolving the surface active agent includes an alkane, an ether and an alcohol. The alkane preferably includes alkanes having 7 to 12 carbon atoms, and specifically is heptane, octane, iso-octane, nonane, decane, undecane, dodecane or the like. The ether is preferably diethyl ether, dipropyl ether, dibutyl ether or the like. The alcohol is preferably ethoxyethanol, ethoxypropanol or the like. In addition, as for a reducing agent in a reducing agent solution, a compound including alcohols; polyalcohols; $H_2$; HCHO, $S_2O_6^{2-}$, $H_2PO_2^-$, $BH_4^-$, $N_2H_5^+$, $H_2PO_3^-$ or the like can be singly used, but two or more compounds are preferably concomitantly used.

First and second solutions L1 and L2 are separately prepared in a first preparation oil tank 22 and a second preparation oil tank 24 arranged in the vicinity of a mixing unit 12. More specifically, in the first preparation tank 22, a water-insoluble organic solvent containing a surface active agent and a reducing agent aqueous solution are mixed by a stirrer 22a to prepare the reversed micelle solution of the first solution L1. In the second preparation tank 24, the water-insoluble organic solvent containing the surface active agent and a metal salt aqueous solution containing two or more metal ions selected from the group consisting of families 8, 9 and 10 in the periodic table are mixed by a stirrer 24a to prepare the reversed micelle solution of the second solution L2. In addition, on each perimeter of the first and second preparation tanks 22 and 24, heating jackets 27 and 27 are installed and are heated to an appropriate temperature for causing an early reaction.

First and second solutions L1 and L2 prepared in first and second preparation tanks 22 and 24, are supplied to a mixing unit 12 with feed pumps 29a and 29b through respective feed pipes 26 and 28. In the mixing unit 12, the two solutions L1 and L2 are instantly mixed, then immediately discharged from the mixing unit 12, and are supplied to a gas-liquid separation unit 16 through a pipe 14. A reaction proceeds in the pipe 14, and continuously generates a byproduct gas with the proceeding of the reaction. As described above, in the case of a flow system reaction in which the solutions for chemical reaction are mixed in the mixing unit, and the reaction proceeds in the pipe 14 connected to the mixing unit, it is very important to stabilize the flow of a reaction liquid LM flowing through the pipe 14 by stably removing a byproduct gas continuously generated with the proceeding of the reaction, and thereby to stabilize and uniformize the reaction. By the stabilization and uniformization of the reaction, metal microparticles having fine sizes and preferable monodispersibility can be produced. In the gas-liquid separation unit 16, the metal microparticle forming reaction is finished while the byproduct gas continuously generated with the proceeding of the reaction is continuously and efficiently removed. In this case, in order to reliably remove the byproduct gas continuously generated with the proceeding of the reaction in the gas-liquid separation unit 16, it is necessary for the pipe 14 to have enough length to finish the reaction started by mixing of the two solutions in the mixing unit 12 before the mixed solution reaches a recovery tank 23, and furthermore, preferably to have the length to finish the reaction before the mixed solution reaches the gas-liquid separation unit 16.

Figure 2:
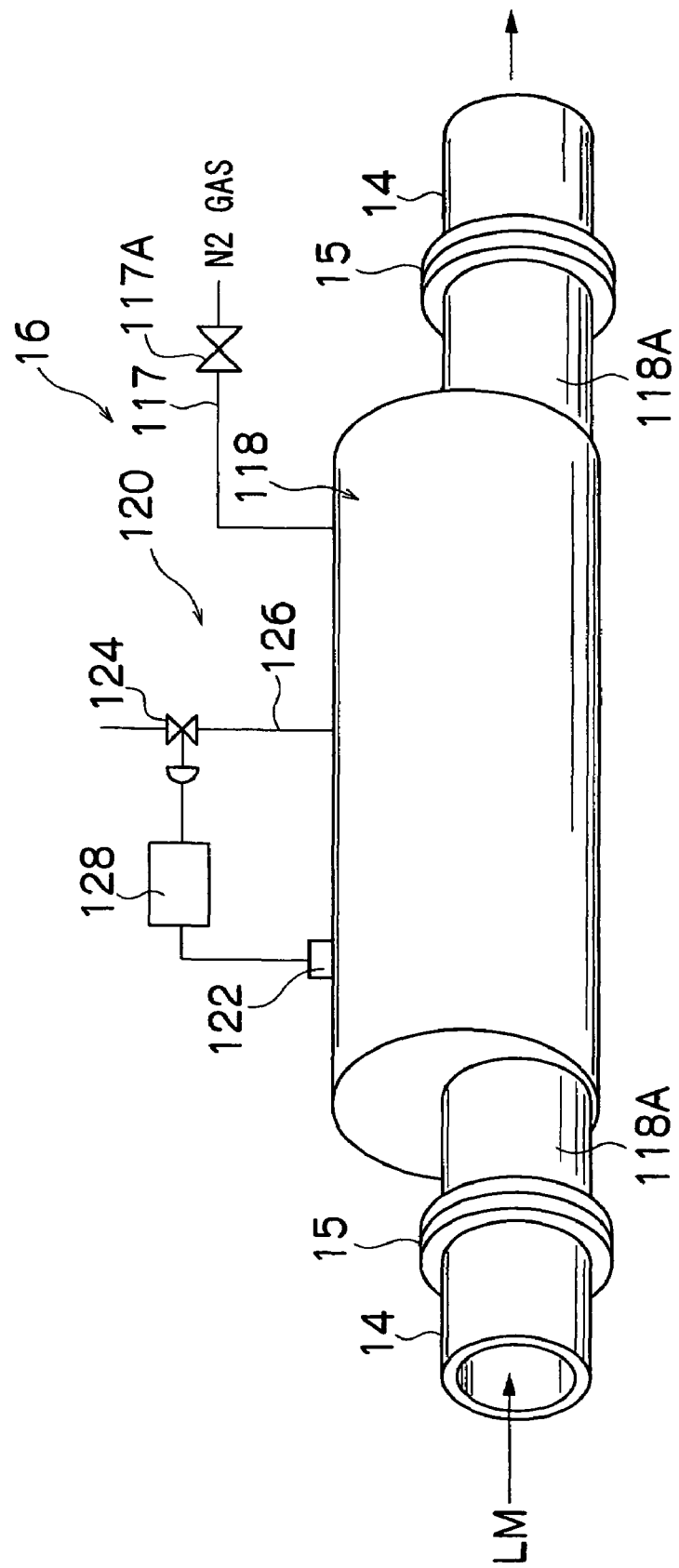
FIG. 2 is a perspective view showing a gas-liquid separation unit according to the present invention.
Figure 3:
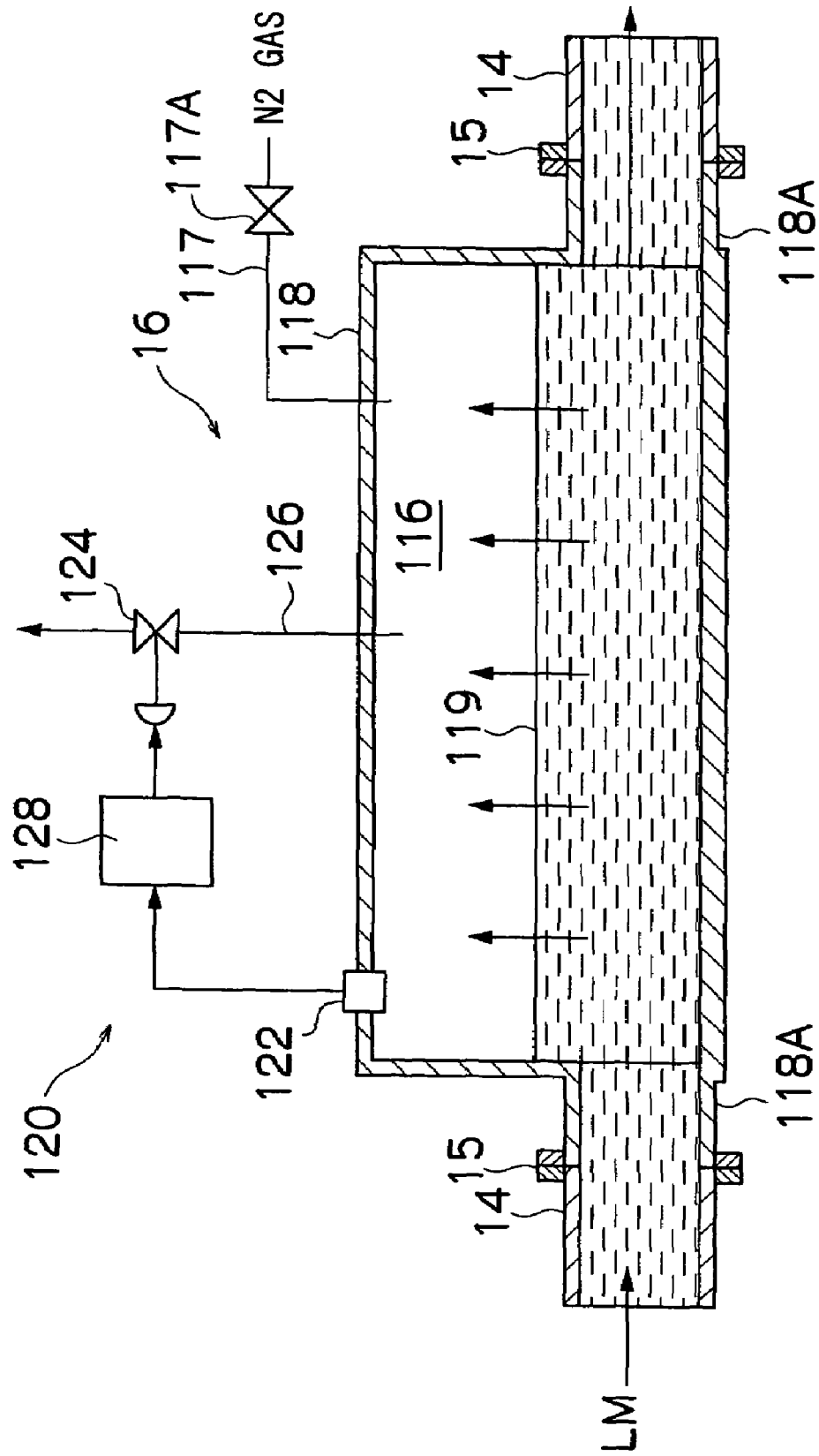
FIG. 3 is a sectional view of a gas-liquid separation unit according to the present invention.

FIG. 2 is a perspective view of a gas-liquid separation unit 16 according to the present invention. FIG. 3 is a cross-sectional view along a direction of the flow of a reaction liquid LM. As shown in the figures, the gas-liquid separation unit 16 mainly comprises the space which is connected to a midway of a pipe 14 and has a volume per unit larger than that of the pipe 14, a gas-liquid separation pipe 118 which is a gas-liquid separation structure for forming a gas-liquid interface 119 when a reaction liquid LM flows through the space, and a pressure adjustment device 120 for adjusting the pressure of a headspace part 116 above the gas-liquid interface 119. In a lower part of both sides of the gas-liquid separation pipe 118, there project connecting pipes 118A and 118A having diameters both equal to that of the pipe 14, and the connecting pipes 118A and 118A are connected with the pipes 14 through flanges 15.

Figure 4:
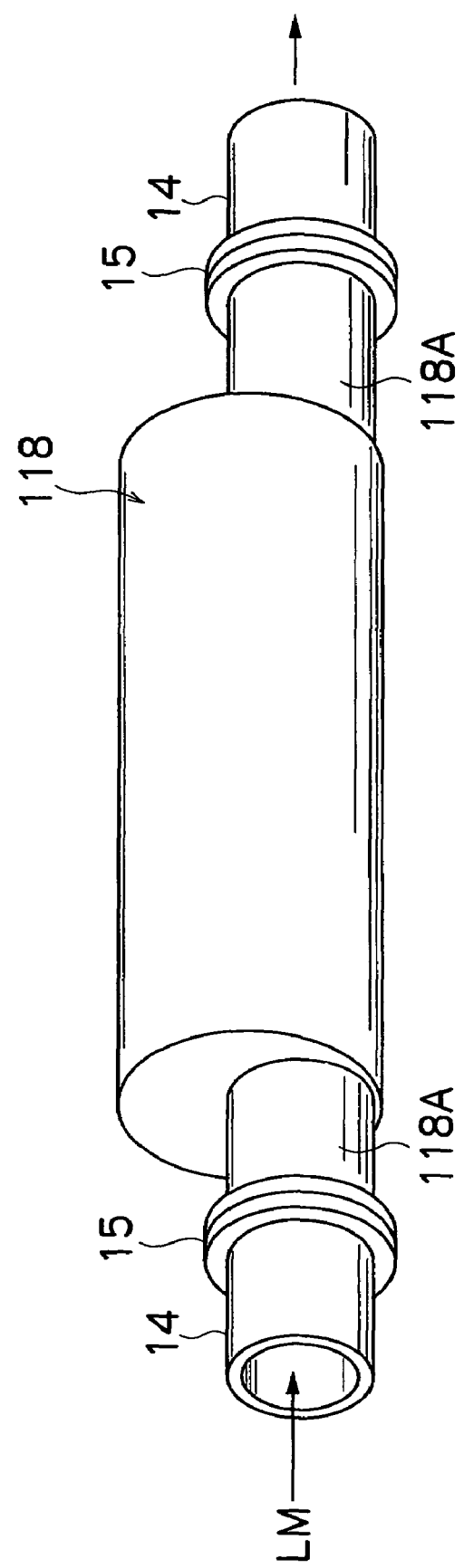
FIG. 4 is a perspective view showing a gas-liquid separation pipe having an ellipsoidal cylinder shape.
Figure 5:
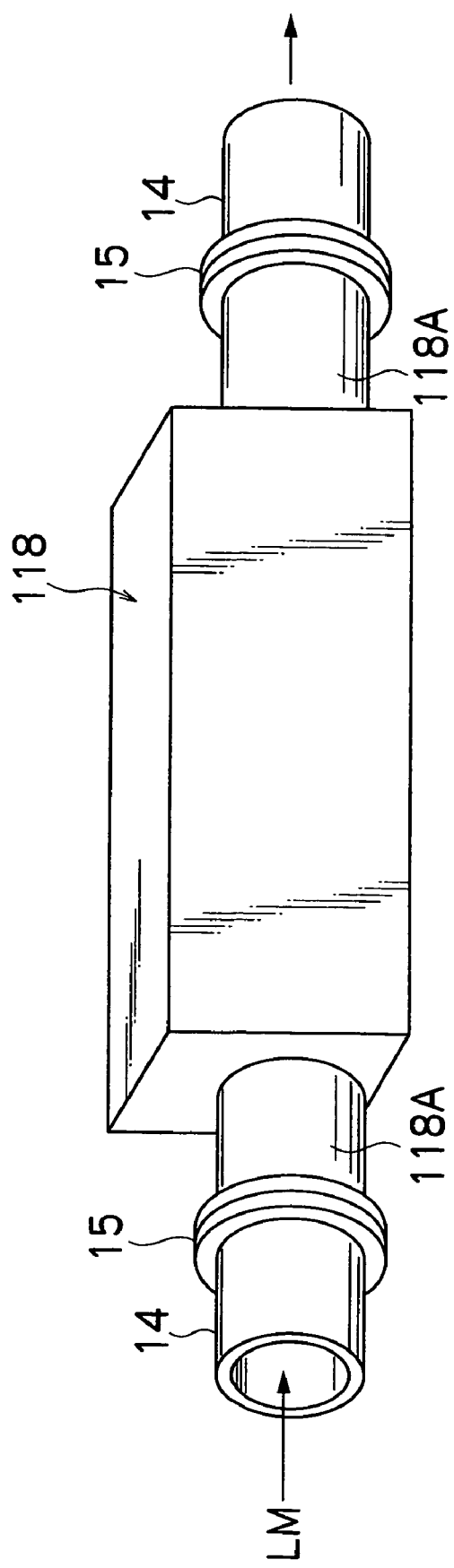
FIG. 5 is a perspective view showing a gas-liquid separation pipe having a square cylinder shape.

In addition, in FIG. 2, a gas-liquid separation pipe 118 has a cylindrical form as a gas-liquid separation structure, but is not limited to the form. A usable form includes such various forms, so far as a headspace part 116 is formed above the gas-liquid interface 119 when a reaction liquid LM flows through the gas-liquid separation pipe 118, as an ellipsoid form as shown in FIG. 4 and a square form in FIG. 5, and further a box form. However, such a form as to make the reaction liquid LM hardly flow through the gas-liquid separation pipe 118 smoothly, or a form as to easily form a dead space of the flow is unfavorable, because a part of a reaction liquid stays in a gas-liquid separation pipe 118, which hinders the uniformization of the reaction. In this respect, the most preferable form of a gas-liquid separation pipe 118 is an ellipsoid form, particularly having the same shape in a lower circle part of the gas-liquid separation pipe 118 with a lower semicircle of the pipe 14, the secondly preferable form of the gas-liquid separation pipe 118 is a cylindrical form, and the thirdly preferable form of the gas-liquid separation pipe 118 is a square form. In addition, when there is a step in the lower ends between pipes 14 and the gas-liquid separation pipe 118, a flowing liquid easily stay at the step, so that the lower ends of the pipe 14s are preferably flush with the gas-liquid separation pipe 118, as shown in FIG. 3.

In order to form an appropriate headspace part 116 in a gas-liquid separation pipe 118, the gas-liquid separation pipe 118 has preferably 1.5 times or larger volume per unit length (in the longitudinal direction of a reaction liquid LM) than the volume per unit length of a pipe 14. Thus, when the reaction liquid LM passes through a gas-liquid separation pipe 118 having a larger volume per unit length than the pipe 14, in the gas-liquid separation pipe 118, a gas-liquid interface 119 is formed between a liquid phase part in which the reaction liquid LM flows, and a gas phase part of a headspace part 116 in which a byproduct gas released from the reaction liquid LM is accumulated. Then, the byproduct gas generated with proceeding of a reaction in the pipe 14 changes into bubbles in a reaction liquid, and moves up to the surface, so that when the reaction liquid LM passes through the gas-liquid separation pipe 118, the byproduct gas is floatation-separated into a headspace part 116 from a gas-liquid interface 119. From this fact, the gas-liquid separation pipe 118 preferably has enough length L in a flowing direction of the reaction liquid, for the bubbles generated in the bottom part of the gas-liquid separation pipe 118, to rise to the surface and be released into the headspace part, after the reaction liquid LM flows into the gas-liquid separation pipe 118 and before the reaction liquid flows out from the gas-liquid separation pipe.

A pressure adjustment device 120 mainly comprises a pressure sensor 122 for measuring the pressure of a headspace part 116, a vent pipe 126 with a valve 124 for exhausting a byproduct gas accumulated in the headspace part 116, and a control part 128 for opening and closing the valve 124 on the basis of the measured value by the pressure sensor 122.

In the degassing step, it is very important for stabilizing and uniformizing a reaction in pipes 14 in front and in the rear of a gas-liquid separation unit 16, to continuously and efficiently remove a generated byproduct gas while keeping the pressure of a headspace part 116 constant at high accuracy, namely while keeping the position of a gas-liquid interface 119 constant, thereby to stabilize the flow of a reaction liquid LM.

From the above fact, a valve 124 used for a pressure adjustment device 120 preferably opens and closes both at a response speed of 10 milliseconds or shorter, and further preferably of 5 milliseconds or shorter. As for the valve opening and closing both in the response speed of 5 milliseconds or shorter, a servo valve is available. Thereby, when the measured value of the pressure sensor 122 varies from a predetermined pressure set value, the valve 124 opens or closes at a very high opening or closing speed, which can eliminate fluctuation in the pressure of a headspace part 116. In addition, when the valve 124 has the response speed of longer than 10 milliseconds, a resistor (not shown) for decreasing a discharge rate of a byproduct gas may be installed at some point of the vent pipe 126 including the valve 124, to make pressure control easy. As the resistor, an orifice or a filter can be preferably used.

In addition, to the gas-liquid separation pipe 118, a purging pipe 117 provided with the valve 117A is connected in order to purge air with an inert gas such as gaseous nitrogen into the gas-liquid separation pipe 118. The purging pipe 117 feeds an inert gas, when the reaction is anaerobic, or a byproduct gas generated by the reaction is a dangerous gas in the presence of oxygen, such as hydrogen gas, into the gas-liquid separation pipe 118 through itself in order to purge air and fill the gas-liquid separation pipe 118 with the inert gas. Furthermore, the purging pipe 117 can be used for the case of feeding the inert gas into the gas-liquid separation pipe 118 to previously raise the pressure in the gas-liquid separation pipe 118 into a higher pressure than ambient pressure, and then sending a reaction liquid LM into the gas-liquid separation pipe 118 to form a gas-liquid interface at an appropriate position in the gas-liquid separation pipe 118 from the beginning. The appropriate position of the gas-liquid interface is the position, for instance, where the cross-sectional area of a reaction liquid flowing through the gas-liquid separation pipe 118 becomes approximately equal to the cross-sectional area of the reaction liquid flowing through the pipe 14. It can be determined by a preliminary test or calculation of what previous pressure in a headspace part 116 forms the appropriate position of the gas-liquid interface.

A gas-liquid separation unit 16 configured as described above can continuously and efficiently remove a byproduct gas only by passing a reaction liquid LM in a gas-liquid separation pipe 118 where the pressure of a headspace part 116 is kept constant. Thereby, an apparatus 10 for continuously producing metal microparticles can be easily constituted only by installing the gas-liquid separation unit 16 in a midway of the pipe 14 which connects a mixing unit 12 with a recovery tank 23. In addition, because the flow of the reaction liquid LM in the gas-liquid separation pipe 118 can be stabilized by keeping the pressure of the headspace part 116 constant, the flow of a reaction liquid LM flowing through a pipe 14 can be stabilized in the pipes 14 in front and in the rear of the gas-liquid separation unit 16.

Subsequently, the structure of a mixing unit 12 preferably used in an apparatus 10 for continuously producing metal microparticles in FIG. 1 will be described below.

A mixing unit used in the present invention is preferably a type of immediately discharging the reaction liquid LM which can be instantly mixed in a mixing field and reacts right after mixture, without making it stay in the mixing field, in the view point of forming metal microparticles which has fine sizes and preferable monodispersibility, and a preferably usable mixing unit includes a high-speed stirring and mixing type, a narrow-gap mixing type and a high pressure mixing type.

(1) High-speed Stirring and Mixing Type

Figure 6:
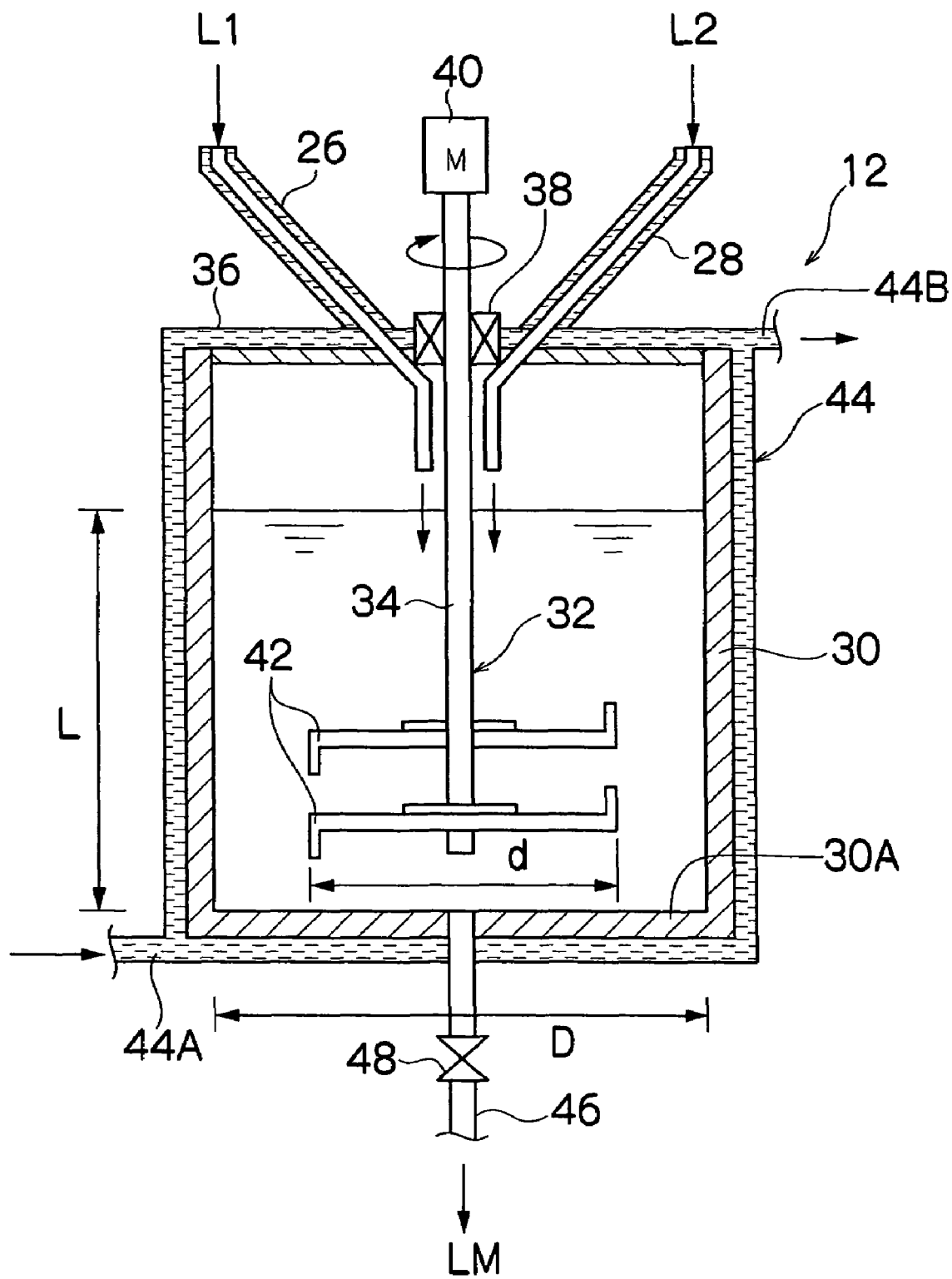
FIG. 6 is a sectional view showing a mixing unit of a high-speed stirring and mixing type.

FIG. 6 is a sectional view of a mixing unit 12 of a high-speed stirring and mixing type.

As is shown in FIG. 6, a mixing unit 12 is formed into a cylindrical vessel shape and comprises a narrow mixing vessel 30 having a retention time of 10 seconds or shorter, and a high-speed stirrer 32 installed therein. The high-speed stirrer 32 has the top part of its vertical rotating shaft 34 rotatably supported on the closure plate 36 of the mixing vessel 30 through a bearing 38, and to the upper end of the rotating shaft 34, a motor 40 fixed to the pedestal which is not shown is connected. In addition, in the lower end of the rotating shaft 34, two stages of edge turbulent type stirring blades 42 in the top and the bottom are installed so as to be immersed in a liquid. The spacing between the stirring blades 42 is preferably in a range of 1.0 d to 0.5 d, when the diameter of the stirring blade 42 is defined as d. In addition, the minor diameter D of the mixing vessel 30 is preferably in a range of D=1.7 d to 3.7 d with respect to the diameter d of the stirring blade 42. Furthermore, the depth of the static liquid in the mixing vessel 30 is preferably in a range of 2 d to 3 d. In addition, in FIG. 6, the type of the stirring blade 42 is shown as an edge turbine type, but a dissolver type, a paddle type, a propeller type and a flat disk type can be used, and further a turbine type and disc turbine type can be also used. Even when any type of a stirring blade 42 is used, the high speed stirrer 32 has such a structure as to make peripheral velocity at the top of the stirring blade 42 to be preferably 5 m/second or longer, and further preferably 10 m/second or longer.

In the periphery of a mixing vessel 30, a jacket 44 through which a heating medium having comparatively large heat capacity, such as water and oil, is wound, and a heat medium inlet 44A and a heat medium water outlet 44B of the jacket 44 are connected to a heat medium-feeding device which is not shown. A first solution L1 is supplied from the previously described first preparation tank 22 through a feed pipe 26, and a second solution L2 is supplied from the second preparation tank 24 through a feed pipe 28. In this case, the top of each of feed pipes 26 and 28 penetrates the top board 36 of the mixing vessel 30, and is extended preferably to the vicinity of a liquid level along a rotating shaft 34 of a high-speed stirrer 32. In addition, an outlet duct 46 for a reaction liquid LM is connected to the base plate 30A of the mixing vessel 30, and a valve 48 is installed on the way of the outlet duct 46.

In the mixing unit 12 of a high-speed stirring and mixing type having the above described configuration, a mixing vessel 30 receives a predetermined quantity of a first solution L1 prepared in a first preparation tank 22 and supplied through a feed pipe 26, and then a high-speed stirrer 32 starts high-speed stirring so as to make a circumferential speed at the tip of the stirring blade 42 to be 5 m/second or longer, and preferably 10 m/second or longer. Subsequently, a second solution L2 is added from a second preparation tank 24 to the first solution L1 in the mixing vessel 30 through a feed pipe 28. In the above step, the temperatures of the solutions L1 and L2 and the temperature in the mixing vessel 30 are set to predetermined temperatures suitable for an early reaction by which metal microparticles with a crystal structure are formed. Under an appropriate mixture reaction temperature condition thus prepared, the first solution L1 in the mixing vessel 30 has an extremely strong slewing flow formed into a V-shape around a rotating shaft 34 which convolutes the solution from a liquid level toward the bottom, and then the second solution L2 added to the vicinity of the rotating shaft 34 is instantly convoluted into the first solution L1 by the slewing flow forming a V-shape, and is uniformly dispersed in the whole first solution L1 in the mixing vessel 30. The reaction liquid LM is mixed and reacts in the mixing vessel 30, and is promptly discharged from an exhaust pipe 46. The residence time in the mixing vessel 30 is preferably 10 seconds or shorter. Thereby, the metal microparticles having fine sizes and preferable monodispersibility are formed. As for the order, the second solution L2 may be charged in the mixing vessel 30 at first, and then the first solution L1 may be charged.

Figure 7:
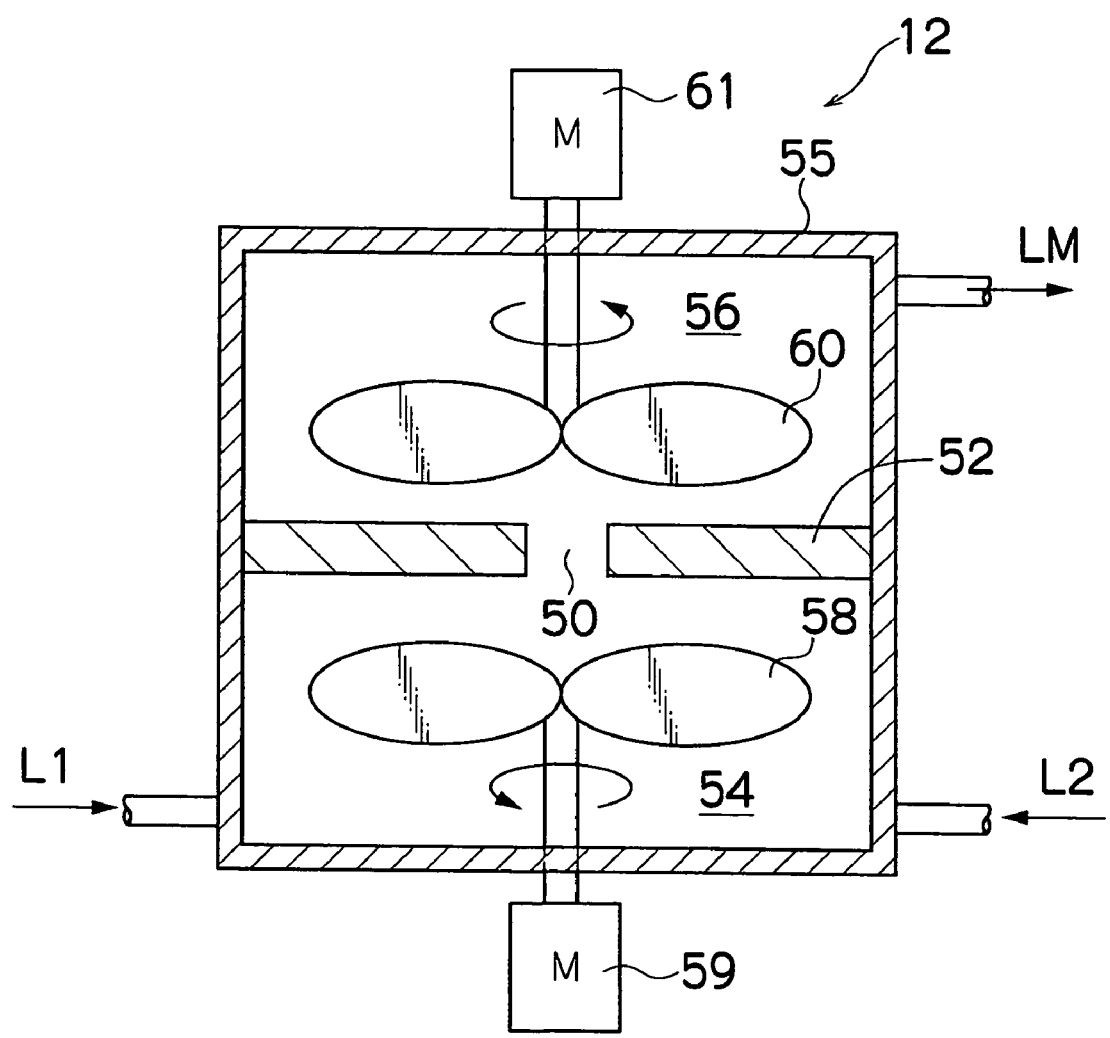
FIG. 7 is a sectional view showing another aspect of a mixing unit of a high-speed stirring and mixing type.

FIG. 7 shows another aspect of a high-speed stirring and mixing type of a mixing unit 12. Specifically, a narrow mixing vessel 55, which gives a solution a residence time of 10 seconds or shorter, is separated into two mixing chambers 54 and 56 with a partition plate 52 having a communicating port 50. In the mixing chambers 54 and 56, stirring blades 58 and 60 are respectively installed and stir the solution at high speed with motors 59 and 61 so as to make circumferential speeds at the tips to be 5 m/second or higher, and preferably 10 m/second or higher. In the case of the mixing unit 12, first and second solutions L1 and L2 are supplied to one mixing chamber 54 at first, and are stirred and mixed with the stirring blade 58 at high speed, and then, the mixed solution flows into another mixing chamber 56 through the communicating port 50, is further stirred and mixed at high speed with the stirring blade 60, and then is discharged. In the case of the mixing unit 12 of a high-speed stirring and mixing type in FIG. 7, because a mixed liquid immediately moves to each of the mixing chambers 54 and 56 without staying, the first and second solutions L1 and L2 are instantly mixed and the reaction liquid can be immediately discharged. Thereby, metal microparticles having fine sizes and preferable monodispersibility are formed.

In addition, a mixing unit 12 for conducting a high-speed stirring method is not limited to the mixing units in FIGS. 6 and 7, but has only to have a structure which can accommodate first and second solutions L1 and L2 in a mixing vessel 30, mix and react them with a liquid-phase reaction method, and make a circumferential speed at the tip of a stirring blade 42 to be 5 m/second or higher.

(2) Narrow-gap Mixing Type

Figure 8:
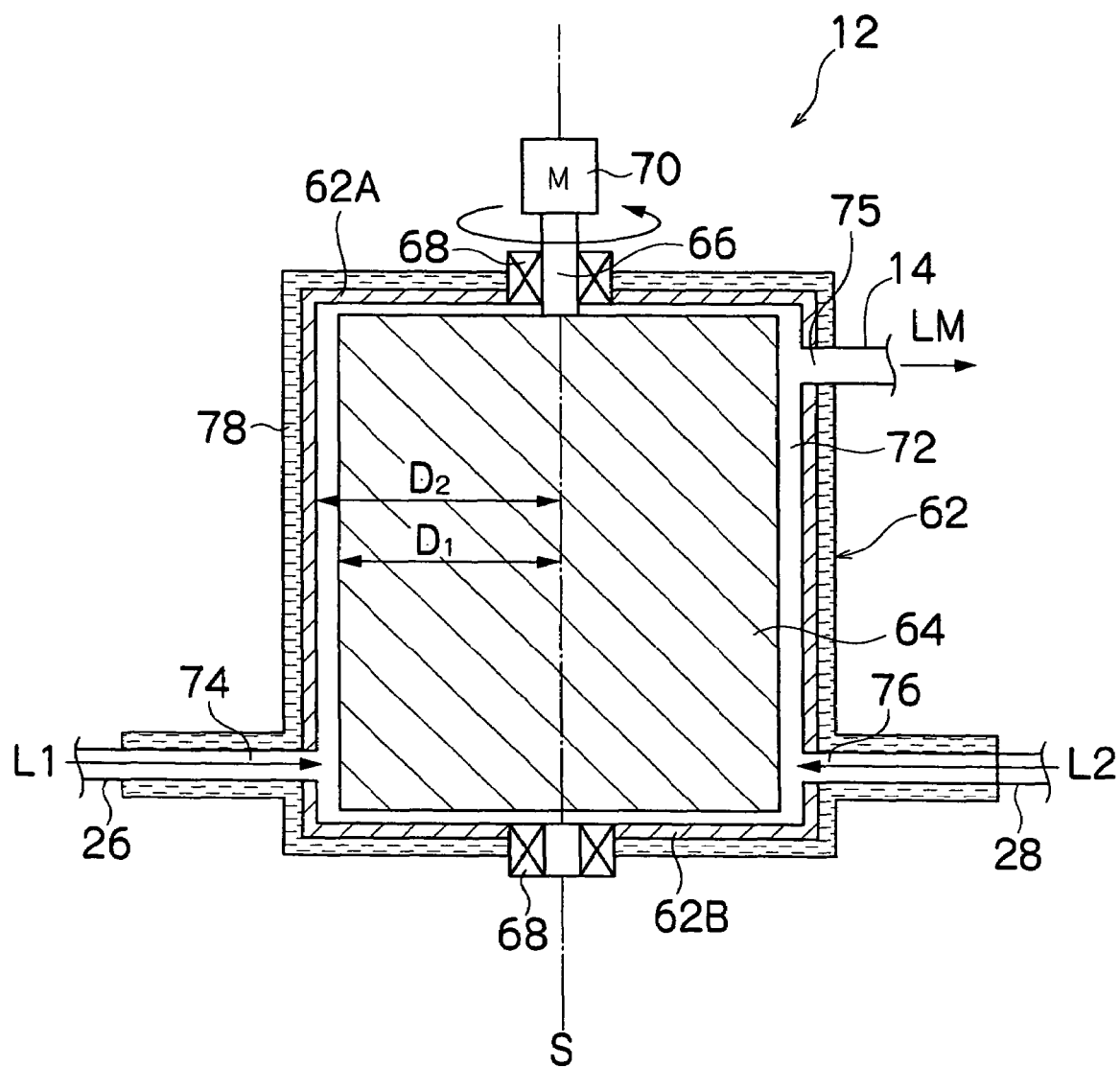
FIG. 8 is a sectional view showing a mixing unit of a narrow-gap type.

FIG. 8 is a sectional view of a mixing unit 12 of a narrow-gap mixing type.

As shown in FIG. 8, a mixing unit 12 has a cylindrical rotatable drum 64 with a slightly smaller diameter than the minor diameter of a mixing vessel 62, installed in the vertical mixing vessel 62 with the shape of a cylindrical vessel having the top and bottom sealed. The rotatable drum 64 has an upright rotating shaft 66 along a rotation center S, and the upper and lower parts of the rotating shaft 66 are rotatably supported on the top board 62A and the bottom plate 62B of the mixing vessel 62 through bearings 68 and 68. In addition, to the upper end of the rotating shaft 66, a motor 70 fixed to the pedestal which is not shown, is connected.

Between the internal circumferential wall face of a mixing vessel 62 and the outer circumferential face of a rotatable drum 64, a ring-shaped narrow-gap 72 is formed. The ring-shaped narrow-gap 72 can be formed by such a setting that when a distance D1 between a rotation center S and a top of the rotatable drum 64 is supposed to be 1, a distance D2 between the rotation center S of the rotatable drum 64 and the closest inner wall of the mixing vessel 62 is in a range of 1.001 to 1.200. In addition, on both sides of the lower end of the mixing vessel 62, a supply port 74 for a first solution L1 and a supply port 76 of a second solution L2 are formed, and each of the supply ports 74 and 76 is respectively connected to each of feed pipes 26 and 28. In addition, on the upper end side of a mixing vessel 62, an exhaust port 75 for a reaction liquid LM is formed and connected to a pipe 14. Around the periphery of a mixing vessel 62, a jacket 78 for passing a heating medium with a comparatively large heat capacity such as water and oil therein, is wound.

In the mixing unit 12 of a narrow-gap mixing type, preferably, width of a gap is from 10 μm to 10 mm. More preferably, width of a gap is from 0.1 mm to 5 mm.

When the mixing unit 12 of a narrow-gap mixing type configured as described above is employed, first and second solutions L1 and L2 are supplied into the narrow-gap 72 of a mixing vessel 62, under an appropriate mixture reaction temperature condition, in a state that a rotatable drum 64 rotates at such an ultra-high speed as to make a circumferential speed at the tip (the top circumferential position) to be 5 m/second or higher, and preferably 10 m/second or higher. The solutions L1 and L2 supplied into the narrow-gap 72, while receiving a uniform shearing force from the internal circumferential wall face of the fixed mixing vessel 62 and the outer circumferential face of the rotatable drum 64 rotating at an ultra-high speed, helically moves from the lower end to the upper end of the mixing vessel 62 inside the narrow-gap 72, then reaches a exhaust port 75, and is discharged to a pipe 14. Because the first and second solutions L1 and L2 can be thus instantly and effectively mixed in the narrow-gap 72, metal microparticles are formed so as to acquire fine sizes and superior monodispersibility. In the above description, when the above described distance D2 is too small as smaller than 1.001, the small distance causes ununiformity of a shearing force due to the effect of surface roughness on the internal circumferential wall face of the mixing vessel 62 and the outer circumferential face of the rotatable drum 64, and thereby makes the monodispersibility of the formed metal microparticles inferior. On the contrary, when the distance D2 is too long as larger than 1.200, the large distance causes a small shearing force given to the solutions L1 and L2, and makes the particle sizes of the formed metal microparticles easily large, and also the monodispersibility easily inferior.

Figure 9:
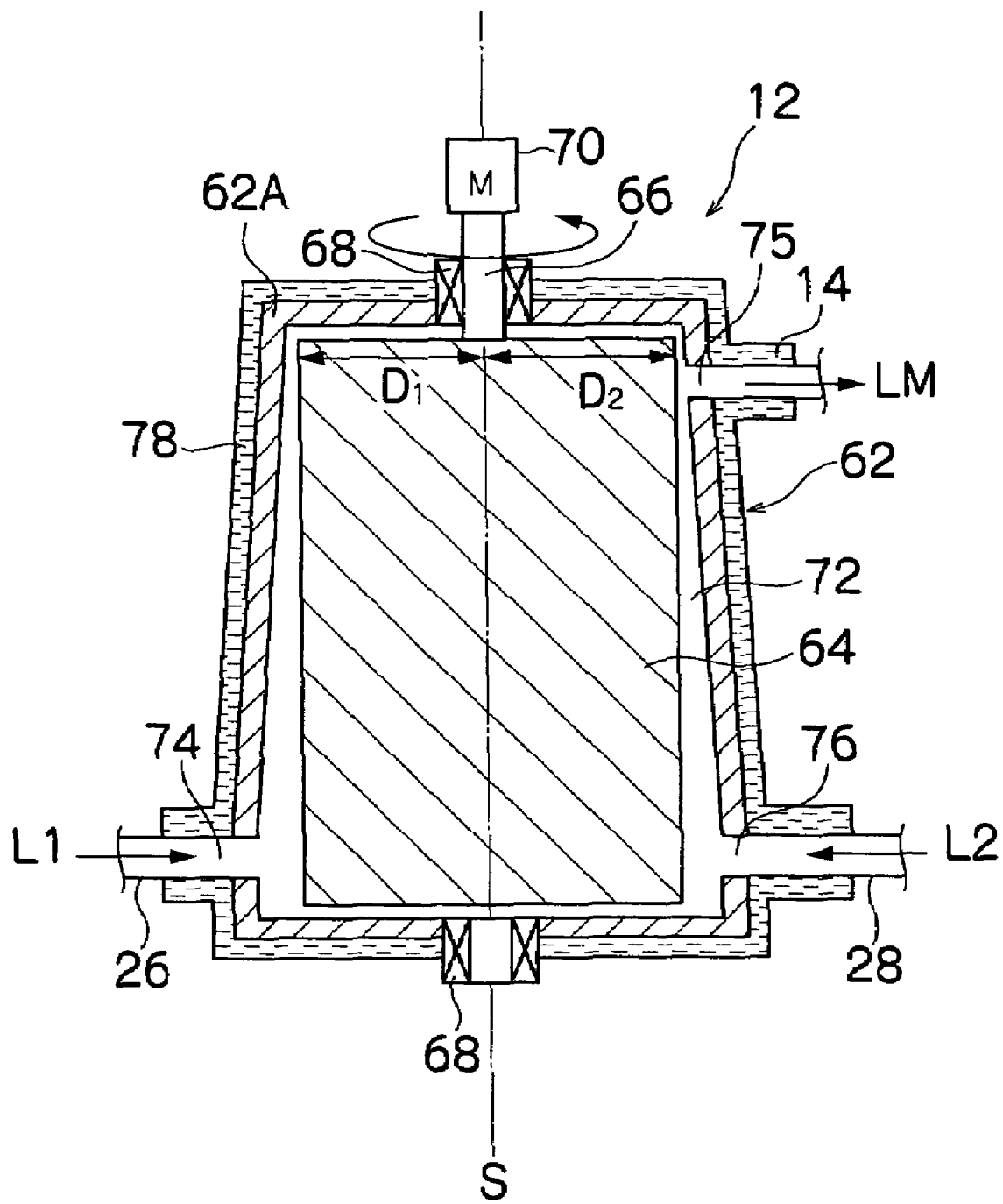
FIG. 9 is a sectional view showing another aspect of a mixing unit of a narrow-gap type.

FIG. 9 is a sectional view showing another aspect of the mixing unit 12 of a narrow-gap mixing type, and the same reference numeral will be put on the same member as in FIG. 8 for explanation.

As shown in FIG. 9, a mixing unit 12 is composed so as to make the inner wall diameter of a mixing vessel 62 get smaller with respect to the major diameter of a rotatable drum 64 as going up to the upper end from the lower end of a mixing vessel 62, and a narrow-gap 72 narrowed as going up to the upper end from the lower end of the mixing vessel 62. When such a mixing unit 12 is employed, first and second solutions L1 and L2 supplied into the narrow-gap 72 get a faster flow rate as the solutions move to the upper end from the lower end of the mixing vessel 62, so that the shearing force given to the first and second solutions L1 and L2 can be slowly increased. Thereby, metal microparticles having fine sizes and superior monodispersibility can be formed. In the above mixing unit, a distance D1 between a center and a top of a rotatable drum 64, and a distance D2 from the rotation center S of the rotatable drum 64 to the closest inner wall of the mixing vessel 62 are the dimension at the upper end position of the mixing vessel 62 as shown in FIG. 9.

Figure 10:
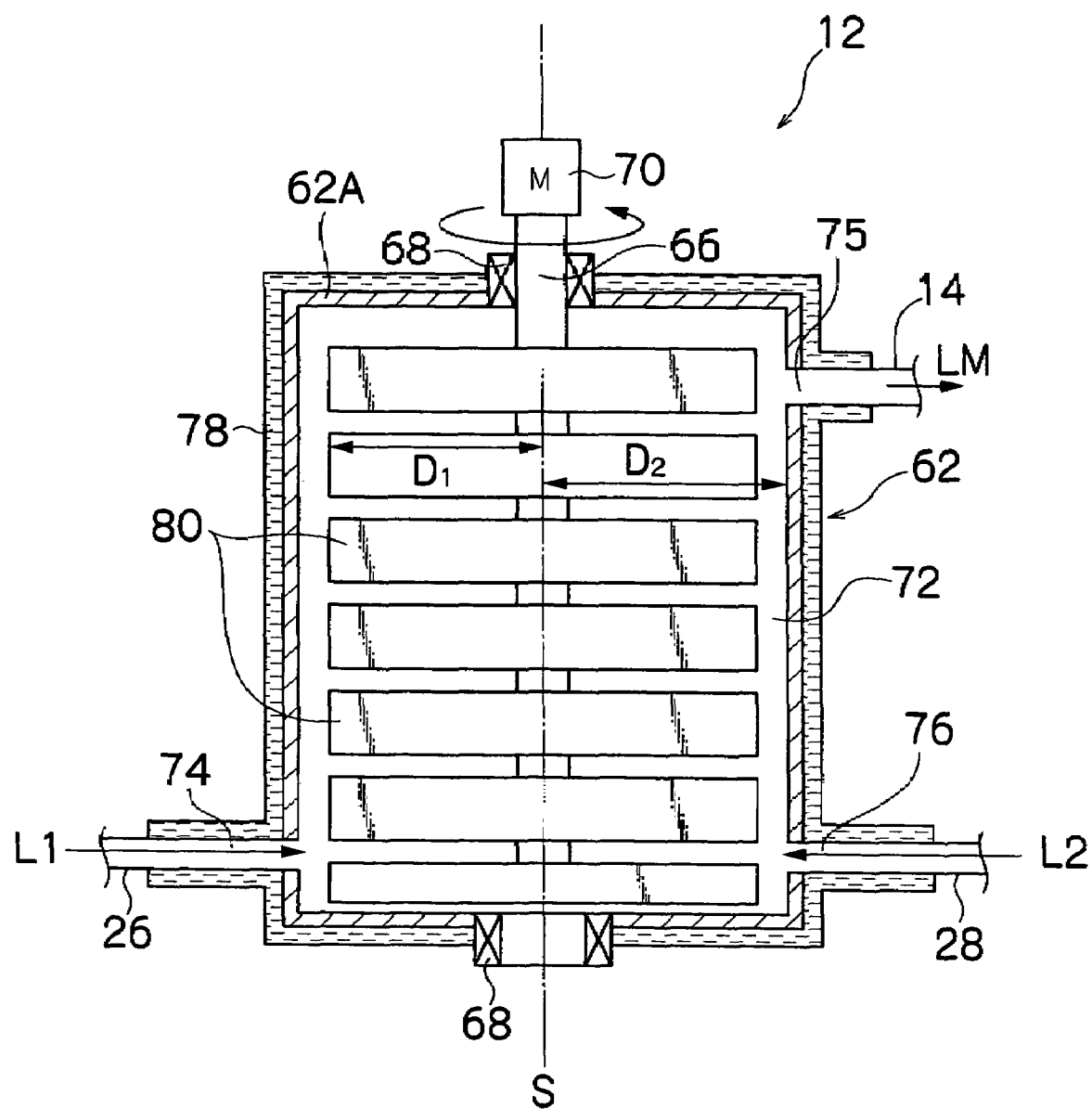
FIG. 10 is a sectional view showing further another aspect of a mixing unit of a narrow-gap type.

FIG. 10 is a sectional view which shows further different aspect of the mixing unit 12 of a narrow-gap mixing type, and the same reference numeral is put on the same member as in FIG. 8 for explanation.

As shown in FIG. 10, a mixing unit 12 has a plurality of disc-shaped flat disks 80, 80 and so on, in place of a rotatable drum 64 arranged around a rotating shaft 66 at a predetermined spacing. In this case, a distance between adjacent flat disks 80 is preferably equal to the narrow-gap 72 which is formed between the outer peripheral surface of the flat disk 80 and the internal circumferential wall face of a mixing vessel 62. Thereby, metal microparticles having small particle sizes and superior monodispersibility can be formed.

In addition, the mixing unit 12 of a narrow-gap mixing type is not limited to FIGS. 8, 9 and 10, but has only to be a unit having the narrow-gap 72 formed between the inner wall of a mixing vessel 62 and the stirring members 64 and 80 which rotate at a high speed, and having such a setting that when a distance between the rotation center S and the top of the stirring members 64 and 80 is supposed to be 1, a distance between the rotation center S of the stirring members 64 and 80 and the closest inner wall is in a range of 1.001 to 1.200, in order to form the narrow-gap 72, and to have such a structure as to supply first and second solutions L1 and L2 into the narrow-gap 72 and mix them and discharge a mixed reaction liquid LM from the narrow-gap 72.

(3) High-pressure Mixing Type

As for a high-pressure mixing type, any of a one-jet type, a T-shaped type, a Y-shaped type and a two-jet facing type can be preferably used.

a) One-jet Type

Figure 11:
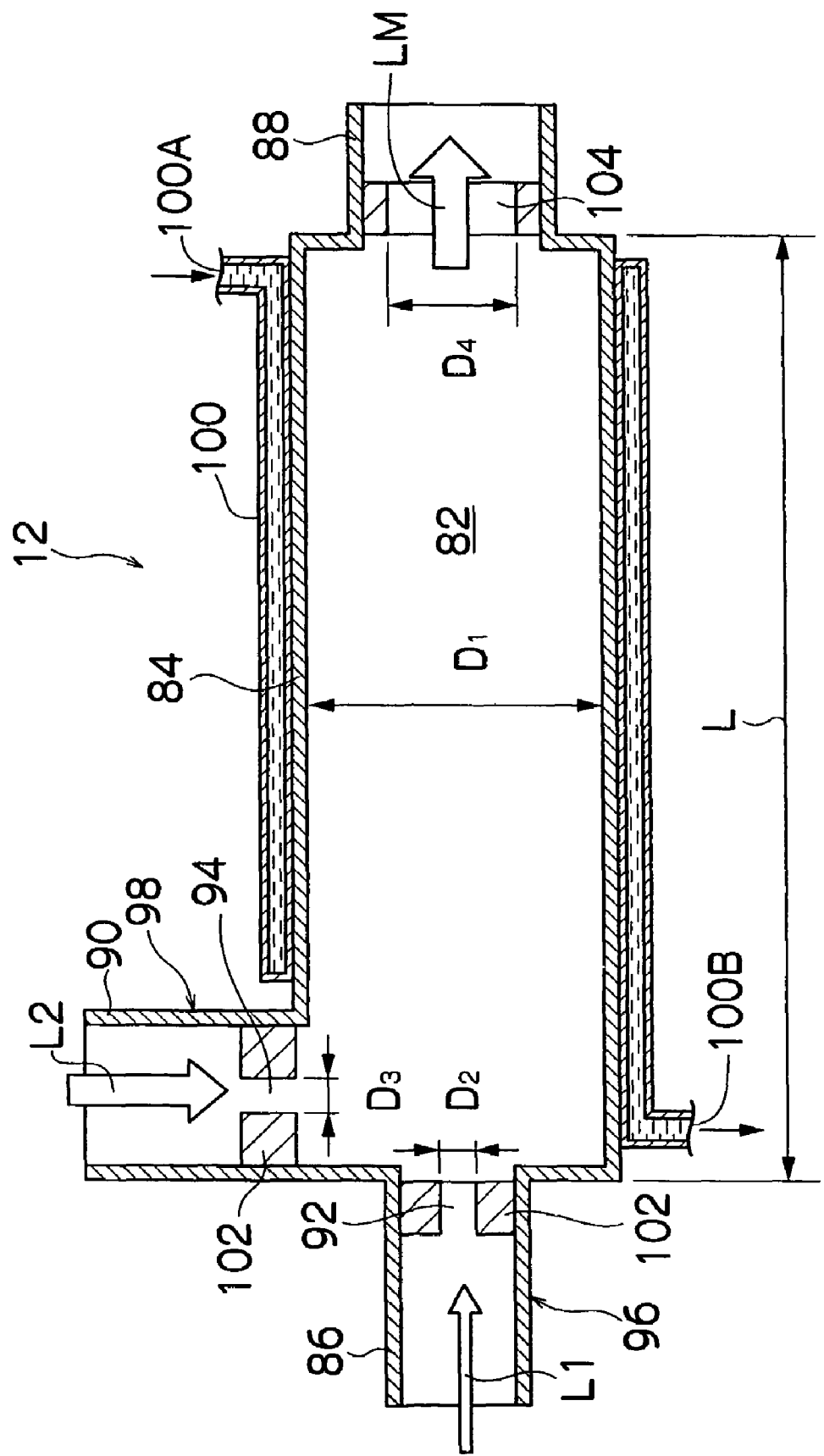
FIG. 11 is a sectional view showing a mixing unit by a high-pressure mixing method of a one-jet type.

FIG. 11 is a sectional view showing a concept of a one-jet type mixing unit 12.

As shown in FIG. 11, a mixing unit 12 comprises a mixing vessel 84 having a cylindrical mixing chamber 82 (a mixing field) formed therein for mixing and reacting first and second solutions L1 and L2 therein, a first conduit 86 for introducing the first solution L1 into the mixing chamber 82, which is connected to an opening at one-end side of the mixing vessel 84, and an outlet duct 88 for discharging a reaction liquid mixed and reacted in the mixing chamber 82, which is connected to the other opening at the other end side of the mixing vessel 84. In addition, to the part on the peripheral surface of the mixing vessel 84 and close to the outlet of the first conduit 86, a second conduit 90 for introducing the second solution L2 into the mixing chamber 82 is connected. In the top inner parts of the first conduits 86 and the second conduits 90, a first orifice 92 and a second orifice 94 are respectively formed, and thereby, in the first conduits 86 and the second conduits 90, a first nozzle 96 and a second nozzle 98 are formed so as to jet a turbulent liquid. In FIG. 11, the first solution L1 is introduced from the first conduit 86, and the second solution L2 is introduced from the second conduit 90, but each liquid can be introduced from a reverse conduit. In addition, an outlet duct 88 may be connected to the side part of the mixing vessel 84, so far as the side part is close to the other end side of the mixing vessel 84.

In addition, on the periphery of the mixing vessel 84, a jacket 100 for passing a heating medium with comparatively high heat-capacity such as water and oil, is wound, and a heat medium inflow entrance 100A and a heat medium water outlet 100B of the jacket are connected to a heat-medium-feeding device which is not shown. A mixture reaction temperature is preferably set appropriately to a predetermined temperature suitable for early reaction according to the types of first and second solutions L1 and L2.

In addition, when the first solutions L1 of right the same number of a plurality of metal atoms are prepared, and the plurality of several solutions are mixed with a second solution L2, one of the solutions has only to form a high-pressure jet flow of 1 MPa or higher. Accordingly, a plurality of nozzle positions for sprouting the plurality of solutions L1 may be arranged on the peripheral side of a mixing vessel 84, or alternatively, a plurality of solutions L1 may be sequentially sprouted from one nozzle position. Consequently, a nozzle for the straight high-pressure jet flow is basically one, but there may be a plurality of nozzles for an orthogonal flow perpendicular to the straight flow.

As for a method for drill-working first and second orifices 92 and 94 of block orifice materials 102, the methods well-known as working methods for precisely boring an exhaust nozzle with a diameter of about 100 μm in the orifice materials 102 such as metal, ceramic and glass, can be preferably used. The well-known methods include micro cutting working, micro grinding, blasting, micro electric discharge machining, a LIGA method, laser beam machining and SPM working.

A material for the orifice material 102 has preferably a superior workability and has hardness close to diamond. Accordingly, the preferably usable materials include, aside from diamond, various metals and metal alloys which are hardened by quenching, nitriding, sintering or the like. In addition, ceramic can be also preferably used, because of having high hardness and superior workability to diamond. In addition, in the present embodiment, a throttle structure of first and second nozzles 96 and 98 is described by taking an orifice as an example, but so far as the throttle structure has a function for jetting a turbulent liquid, any other device can be used without being limited to the orifice.

In the mixing unit, a first conduit 86 and a second conduit 90 have a compressing device which is not shown, through which a first solution L1 and a second solution L2 are compressed and supplied to the first and second nozzles 96 and 98. However, the pressure for sprouting the solution from the second nozzle 98 into a mixing chamber 82 is controlled smaller than the pressure of the high-pressure jet flow which jets out from the first nozzle 96 to the mixing chamber 82. As for the compressing device for applying a high pressure to a liquid, various devices are known and any one can be used, but a reciprocating pump such as a plunger pump and a booster pump are preferably used, because they are comparatively available and inexpensive. In addition, though a rotary pump cannot generate such a high pressure as the reciprocating pump, a high-pressure generation type of the rotary pump may be used.

Then, a first solution L1 is sprouted to a mixing chamber 82 from a first nozzle 96 in the form of a jet flow at a high pressure of 1 MPa or higher and a turbulent flow with the Reynolds number of 10,000 or more when flowing into the mixing chamber 82, and a second solution L2 having a lower pressure than the first solution L1 is sprouted from a second nozzle 98 to the mixing chamber 82, as a cross flow almost perpendicular to the first solution L1. In this case, even if the second solution L2 is not perpendicular to the first solution L1 precisely at an angle of 90 degree, the second solution L2 has only to contain a perpendicular velocity vector component as the main component. Thereby, the first and second solutions L1 and L2 are instantly and effectively mixed under an appropriate mixture reaction temperature condition, and a reacted reaction liquid LM is immediately discharged from an exhaust pipe 88. As a result, metal microparticles having fine sizes and adequate monodispersibility are formed.

Figure 12:
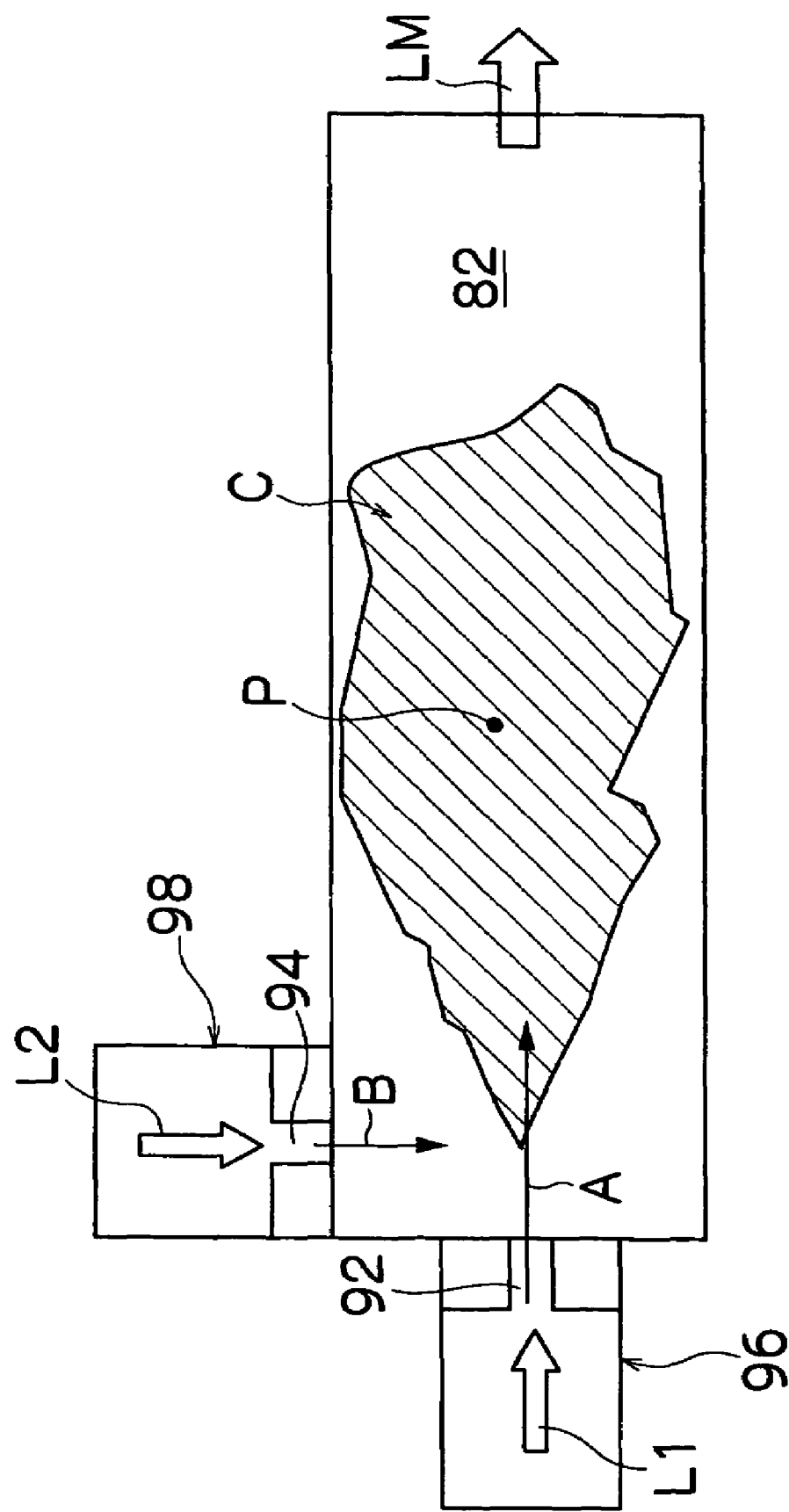
FIG. 12 is an explanatory drawing for explaining a mixing theory for a high-pressure mixing method of a one-jet type.

The mixture reaction, as is schematically shown in FIG. 12, utilizes high eddy viscosity generated when the first solution L1 of a turbulent jet flow with a high speed and a high pressure convolutes the second solution L2 sprouted from an almost perpendicular direction to the first solution L1 so as to be accompanied by the second solution L2, and the first and second solutions L1 and L2 are mixed to obtain a high mixing efficiency, so that the above described mixing chamber 82, first and second nozzles 96 and 98 and exhaust pipe 88 of the mixing unit 12 are formed so as to have the relation described below.

Specifically, because eddy viscosity is necessary to be formed in a mixing chamber 82, a cylinder diameter D1 is formed so as to be larger than an orifice diameter D2 of a first nozzle 96 and an orifice diameter D3 of a second nozzle 98. Because the eddy viscosity particularly produced by a first solution L1 of a straight flow A is important for increasing a mixing efficiency, the dimension ratio of the cylinder diameter D1 of the mixing chamber 82 to the orifice diameter D2 of the first nozzle 96 is preferably in a range of 1.1 to 50, and further preferably 1.1 to 20. In addition, in order to make a second solution L2 of a cross flow B perpendicular to the straight flow A easily convoluted in the solution L1 of the straight flow A, the pressure of the cross flow B is preferably decreased below the pressure of the straight flow A to make a spouting speed of flow equal to that of the straight flow A or less. Specifically, the ratio of the spouting speed of the cross flow B to that of the straight flow A is preferably 0.05 to 0.4, and further preferably 0.1 to 0.3.

In addition, a cross flow B is necessary to be sprouted to a mixing chamber 82 before the position in which eddy viscosity C formed by the straight flow A which is sprouted from the first nozzle 96 with a small diameter to the mixing chamber 82 having a larger diameter than it, is maximized, and consequently a second nozzle 98 is necessary to be placed at a position between the first nozzle 96 and the position of the maximum eddy viscosity C. Accordingly, it is necessary to know the position in which the eddy viscosity C is maximized. The position in the mixing chamber 82, in which the eddy viscosity C is maximized can be grasped by previously performing a simulating calculation with the use of the numerical analysis software RFLOW made by Rflow Co., Ltd., which has been already on the market as a flow analysis software in Japan and is known well as the flow analysis software. In this case, as can be seen from FIG. 12, the position of allowing the eddy viscosity C maximized is not a pinpoint but has a region, so that the position of allowing the eddy viscosity C maximized has only to be determined as a point P of an almost central position of the eddy viscosity C. Accordingly, the second nozzle 98 is preferably positioned in the front of the point P, but the position of the second nozzle 98 is more preferably determined so that the crossing flow B can be sprouted at an early stage of forming the eddy viscosity C.

In addition, as a result of analysis with the use of the above described numerical analysis software, it was found that the central point P of the region where eddy viscosity C appears has a relationship to the flow rate of a straight flow A, and approximately matches the position in which the maximum flow rate (normally a flow rate at the first nozzle position) of the straight flow A is lowered to 1/10. Accordingly, by calculating the position in which the maximum flow rate of the straight flow A is lowered to 1/10, the position of a second nozzle 98 can be determined so that the crossing flow B can be sprouted to the front of the point. Then, it is not necessary to calculate the point P.

In addition, in order to form the maximum eddy viscosity C in a mixing chamber 82, the length L (see FIG. 1) of the mixing chamber 82 is necessary to be secured, but too long length makes a reaction liquid LM easy to stay or reversely flow in the mixing chamber 82 and adversely affects the atomization and the monodispersibility of metal microparticles. Consequently, the length L of the mixing chamber 82 is preferably 2 to 5 times, and further preferably 2 to 3 times of a distance between the first nozzle 96 and the point P which is the position of allowing the eddy viscosity C maximized.

Furthermore, when a liquid is sprouted from the first and second nozzles 96 and 98 having small diameters to a mixing chamber 82 having a larger diameter than the nozzles at a high flow rate, cavitation tends to occur, and by the cavitation, a gas-liquid interface is formed in the mixing chamber 82 to decrease a mixing efficiency. Accordingly, in order to increase the mixing efficiency with the utilization of eddy viscosity C, it is necessary not to form a gas-liquid interface in the mixing chamber 82. Consequently, as shown in FIG. 11, it is necessary to make the bore diameter D4 of an exhaust pipe 88 smaller than the cylinder diameter D1 of the mixing chamber 82 by reducing a bore diameter D4 by a third orifice 104, and to mix two solutions in a state of raising the pressure of the mixing chamber 82. Because cavitation can be canceled thereby, a mixing efficiency is further improved. In addition, in order to shorten a residence time as much as possible in the part which does not contributes to mixing as in an exhaust pipe 88, it is recommended to reduce the cross-sectional area of an outlet in the mixing chamber 82, to make the exhaust pipe 88 having a smaller minor diameter than at least the cylinder diameter D1 of the mixing chamber 82 shortened as much as possible, and to connect it to a pipe 14.

In addition, the shape of a spouted flow from a first nozzle 96 to a mixing chamber 82 is controlled by a first orifice 92 installed in the first nozzle 96, and affects a mixing performance. Thus, according to the purpose of a mixture reaction, the shape of a spouted flow is preferably selected among a filar shape, a cone shape, a slit shape and a deltaic shape, through appropriately selecting the first orifice 92 which forms the above shapes. In the case of a reaction, for instance, having an extremely high reaction rate of a millisecond order, a straight flow A and a crossing flow B are necessary to be sprouted so as to make eddy viscosity C instantly maximized in as narrow an area as possible, and then such a first orifice 92 as to form a filar shape of a sprouting flow is preferable. In the case of a reaction having a comparatively low reaction rate, the straight flow A and the crossing flow B are preferably sprouted so as to make the eddy viscosity C maximized in as wide an area as possible, to increase an accompanied interfacial area produced by the straight flow A, and thus in this case, the first orifice 92 which forms a thin-film shape of a sprouting flow is preferably employed. Furthermore, in the case of an intermediate reaction rate between an extremely low reaction rate of a millisecond order and a comparably low reaction rate, the first orifice 92 which forms a cone shape of a sprouting flow is preferable.

FIGS. 13A to 16C show the first orifice 92 for forming each sprouting flow with a filar shape, a cone shape, a slit shape and a deltaic shape. In each figure, FIG. A show a figure of viewing an orifice from a top side, FIG. B shows a longitudinal section of an orifice, and FIG. C shows a cross section of an orifice.

Figure 13A:
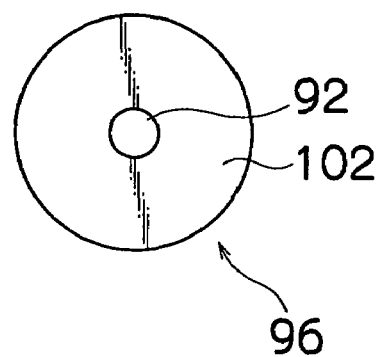
FIGS. 13A, 13B, and 13C are explanatory drawings for explaining a shape of a first nozzle in a mixing unit by a high-pressure mixing method of a one-jet type.
Figure 13B:
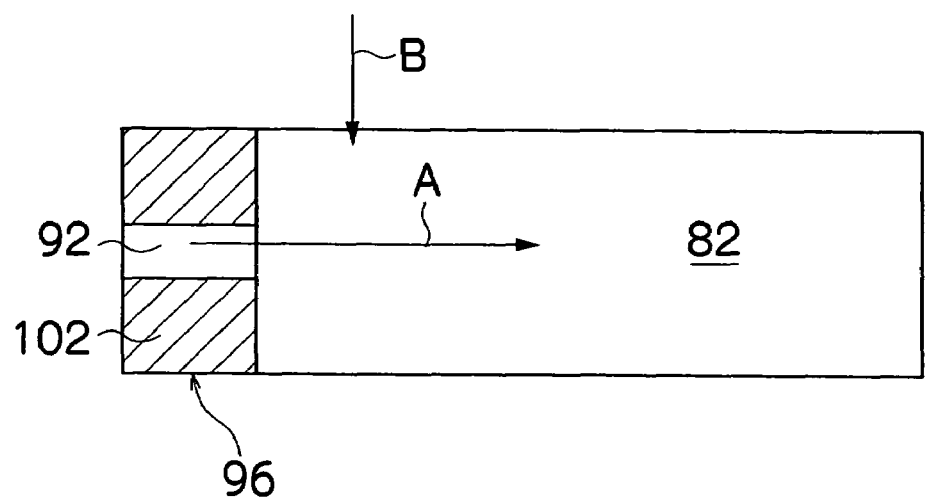
Figure 13C:
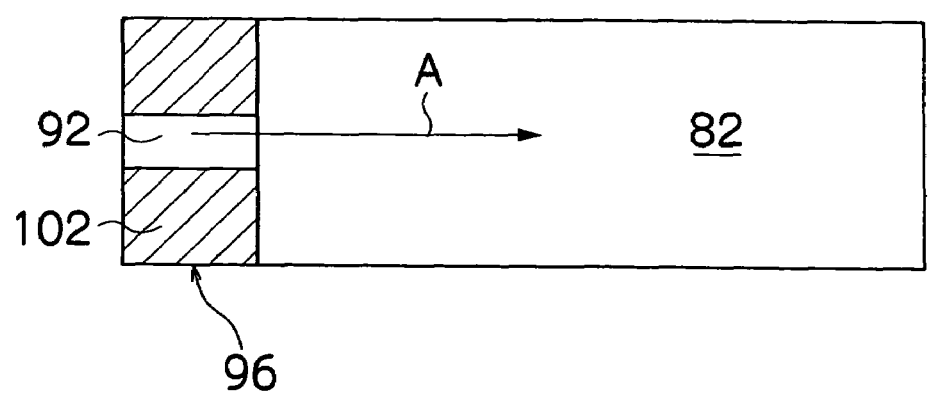
Figure 14A:
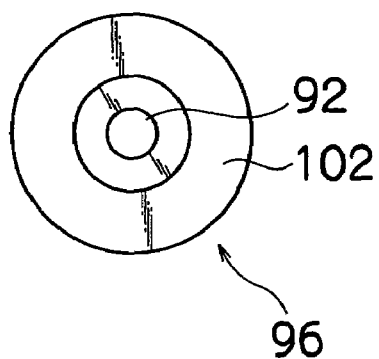
FIGS. 14A, 14B, and 14C are explanatory drawings for explaining another shape of a first nozzle.
Figure 14B:
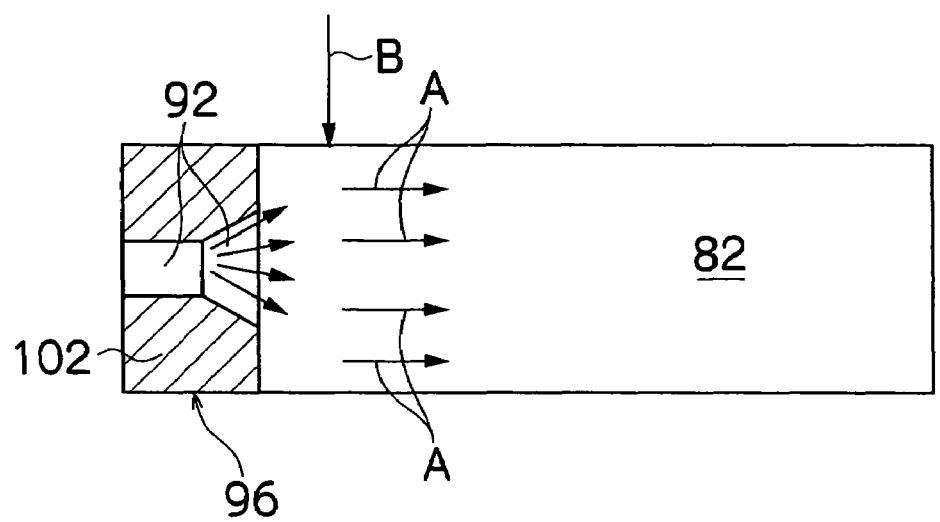
Figure 14C:
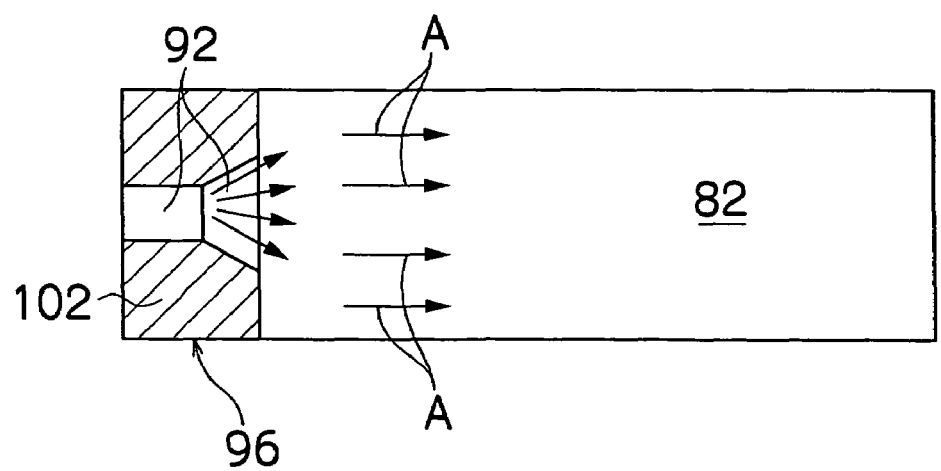
Figure 15A:
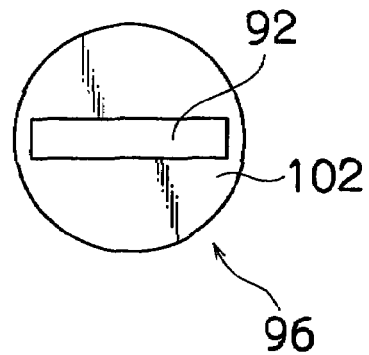
FIGS. 15A, 15B, and 15C are explanatory drawings for explaining further another shape of a first nozzle.
Figure 15B:
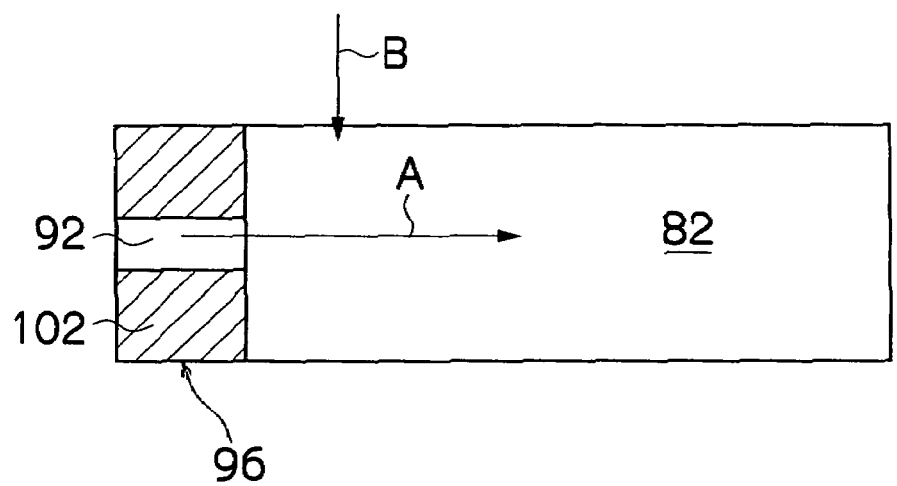
Figure 15C:
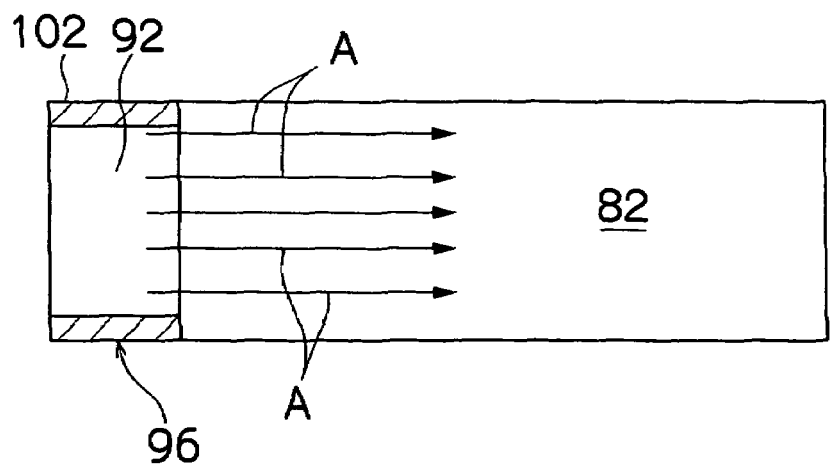
Figure 16A:
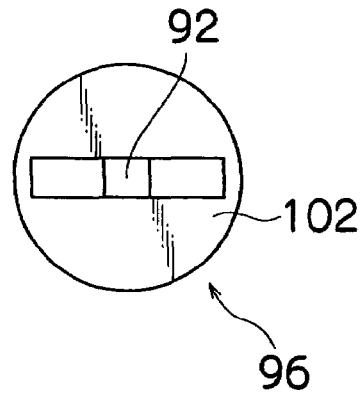
FIGS. 16A, 16B, and 16C are explanatory drawings for explaining the other shape of a first nozzle.
Figure 16B:
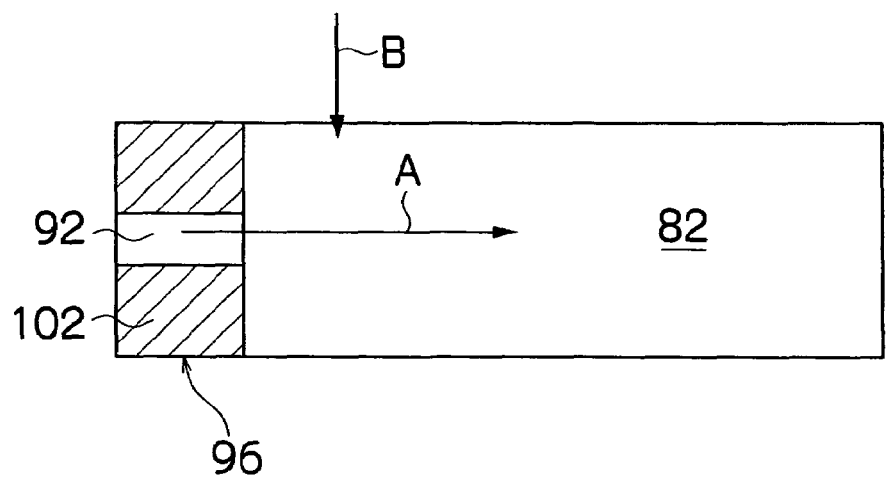
Figure 16C:
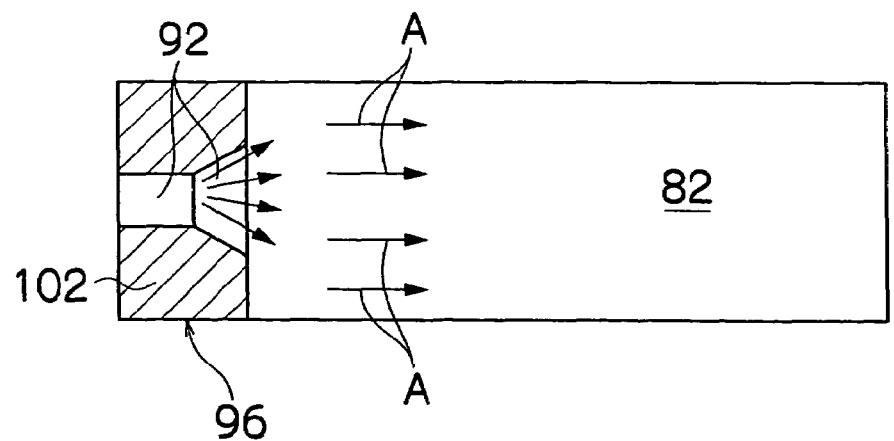

FIGS. 13A to 13C show the shape of a first orifice 92 for sprouting a filar straight flow A to a mixing chamber 82, which is formed into a filar shape. FIGS. 14A to 14C show a shape of the first orifice 92 for sprouting the cone-shape of the straight flow A to the mixing chamber 82, and the straight flow A is formed into the wrapper-tube shape of which the front end is opened. FIGS. 15A to 15C show the first orifice 92 for sprouting a thin straight flow A to the mixing chamber 82, which is formed into the shape of a rectangular slit. FIGS. 16A to 16C show the first orifice 92 for sprouting a deltaic thin straight flow A to the mixing chamber 82, which is formed into a deltaic shape having the diameter of the front end expanded.

In addition, the mixing unit 12 of a one-jet mixing type is not limited to FIG. 11 described above, but any type can be used so far as it employs the static mixing unit which sprouts out first and second solutions L1 and L2 from each nozzle to a mixing field having a larger diameter than the diameter of the nozzle to mix and react the solutions, and discharges the mixed reaction liquid from an exhaust port having a smaller diameter than that of the above described mixing field, sprouts out at least one of the solutions L1 and L2 into a mixing field in the form of a jet flow at a high pressure of 1 MPa or higher and a turbulent flow with the Reynolds number of 10,000 or more when flowing into the mixing field, and can add the rest solution to the front of the position at which the eddy viscosity formed by the high-pressure jet flow in a flow direction, is maximized, with a lower pressure than that of the above described high-pressure jet flow.

b) T-shape and Y-shape

Figure 17:
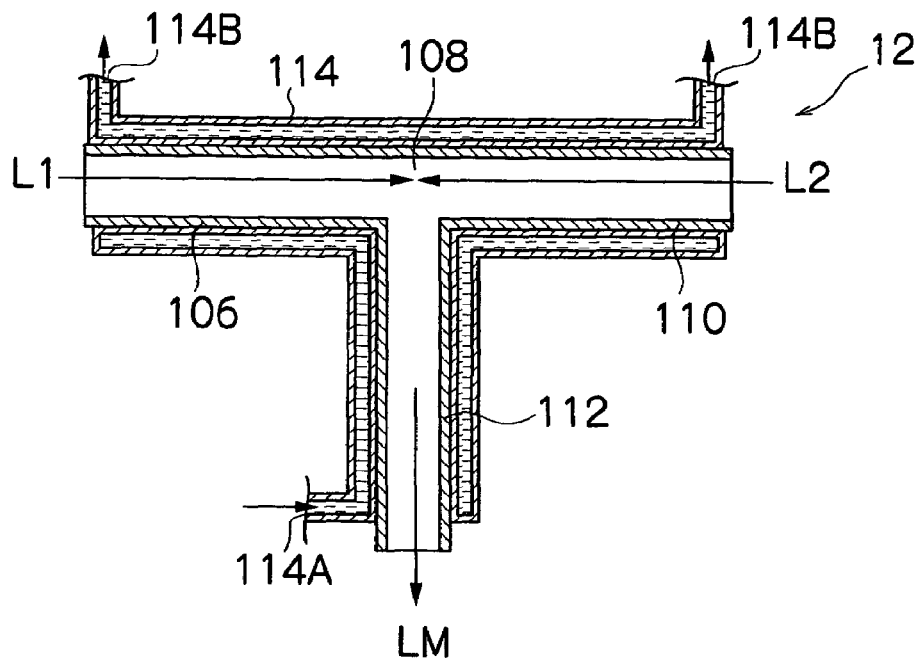
FIG. 17 is a sectional view showing a mixing unit by a high-pressure mixing method of a T-shape type.
Figure 18:
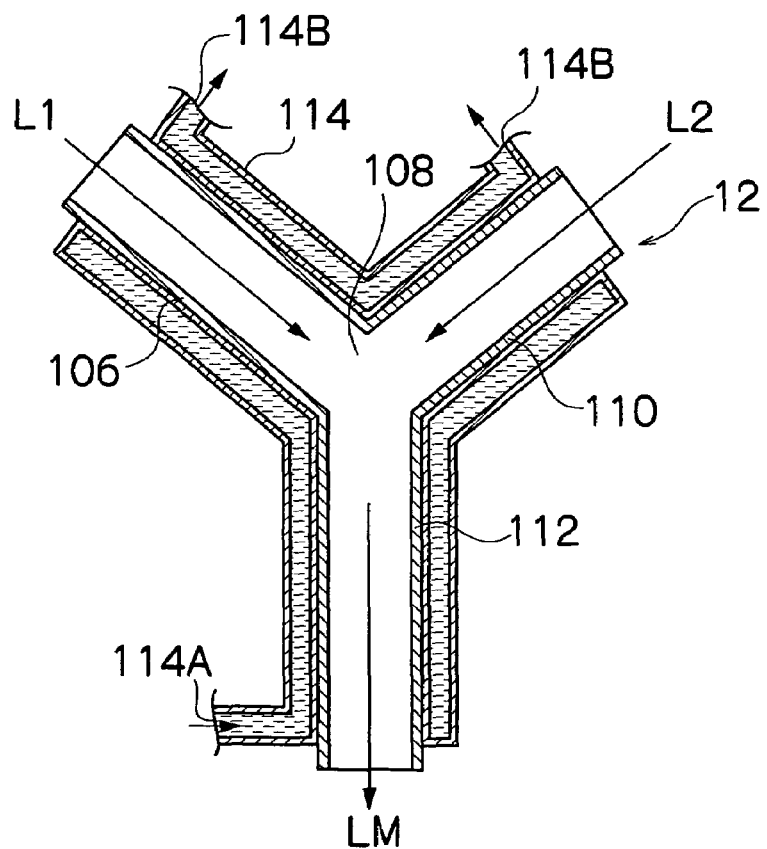
FIG. 18 is a sectional view showing a mixing unit by a high-pressure mixing method of a Y-shape type.

FIGS. 17 and 18 are sectional views of T-shaped and Y-shaped mixing units 12, and FIG. 17 shows a T-shaped pipe and FIG. 18 shows a Y-shaped pipe.

As shown in FIGS. 17 and 18, a T-shaped pipe and a Y-shaped pipe instantly mix first and second solutions L1 and L2 at the intersection (a mixing field) of extremely thin pipes of themselves by colliding both solutions in the form of a jet flow with a high pressure of 1 MPa or higher, and discharge the reacted reaction solution from an exhaust pipe in a short time. More specifically, the T-shaped type and the Y-shaped type sprout a first solution L1 from a first adding pipe 106 to the mixing field 108 in the jet flow with a high pressure of 1 MPa or higher, and the second solution L2 from a second adding pipe 110 to the mixing field 108 in the jet flow with a high pressure of 1 MPa or higher, to collide both solutions; and then the reaction liquid LM which has been mixed by the energy of collision and reacted, is discharged from an exhaust pipe 112 in a short time. In addition, the pressures of the first and second solutions L1 and L2 may be equal or different from each other, so far as they are 1 MPa or higher. In addition, around the peripheries of the first adding pipe 106, the second adding pipe 110 and the exhaust pipe 112, a jacket 114 is wound to control a mixture reaction temperature of the first and second solutions L1 and L2 in the mixing field 108. Here, a numeral 114A in FIGS. 17 and 18 denotes an inlet for a heating medium of the jacket 114, and a numeral 114B denotes an outlet for the heating medium.

Thereby, first and second solutions L1 and L2 are so instantly and effectively mixed and react under an appropriate mixture reaction temperature condition, and the reacted liquid is so immediately discharged from an exhaust pipe 112 that metal microparticles having fine sizes and adequate monodispersibility can be formed.

c) Two Counter-jets Type

Figure 19:
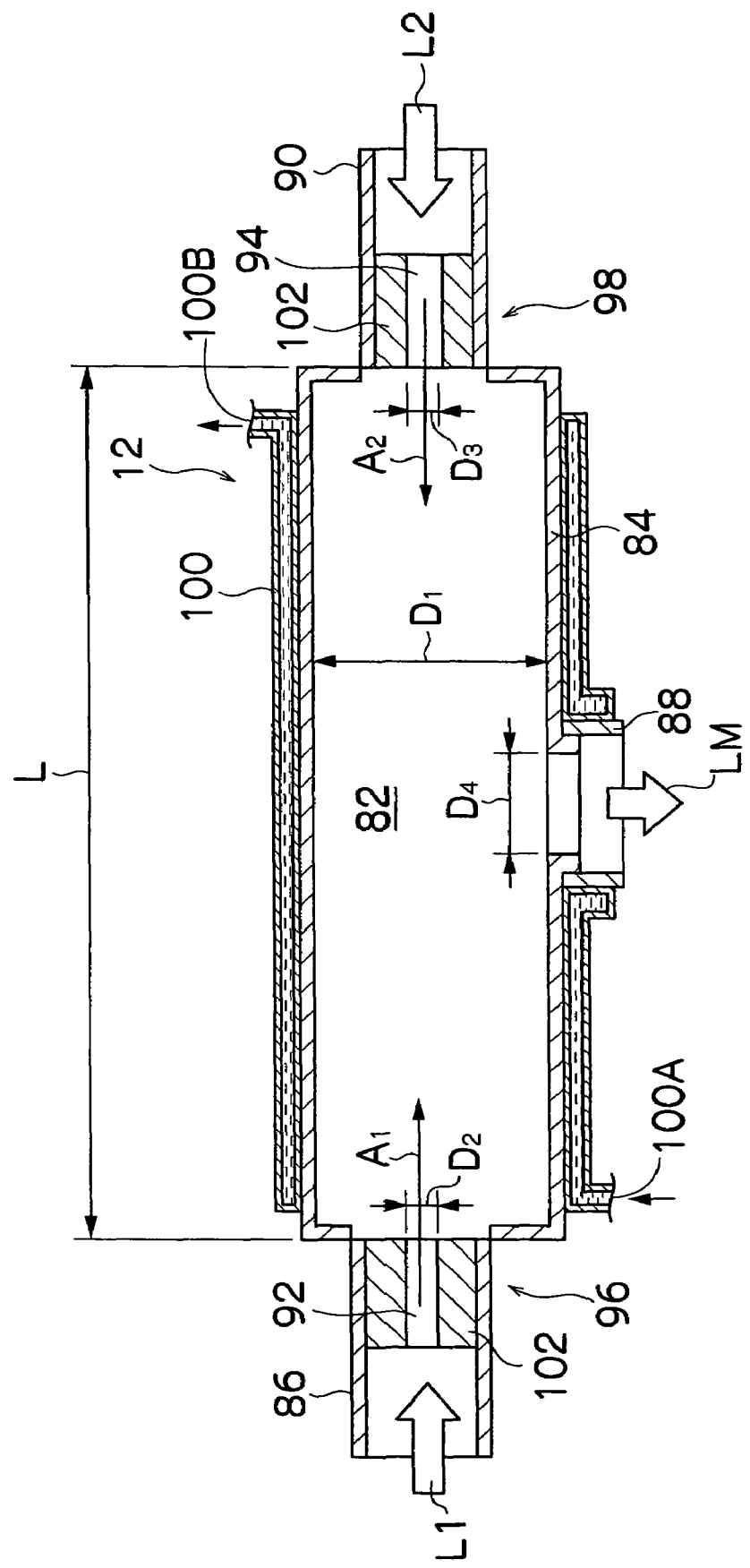
FIG. 19 is a sectional view showing a mixing unit by a high-pressure mixing method of a two counter-jets type.

FIG. 19 shows a mixing method adding a concept of eddy viscosity to a T-shaped type, where the same member with the member in FIG. 11 is marked with the same numeral for convenience of explanation. The mixing method comprises sprouting first and second solutions L1 and L2 from a counter direction in the form of a jet flow with a high pressure of 1 MPa or higher, to a mixing chamber 82 (a mixing field) having a diameter larger than that of a nozzle for sprouting the solutions L1 and L2, to collide them, mixing them by taking the advantage of eddy viscosity produced in both solutions, and discharging the reacted liquid LM from an exhaust pipe 88 having a smaller diameter than the mixing chamber 82 has.

A mixing unit 12 in FIG. 19, has a first conduit 86 for introducing a first solution L1 into a mixing chamber 82 connected to the one-end opening of a mixing vessel 84 having a cylindrical mixing chamber 82 for mixing and reacting the first solution L1 and a second solutions L2, formed therein; the second conduit 90 for introducing the second solution L2 into the mixing chamber 82 connected to the other-end opening; and an exhaust pipe 88 for discharging the reacted liquid LM which has been mixed and reacted in the mixing chamber 82, from the mixing chamber 82, connected to the central opening of the mixing vessel 84.

Inside the tips of first and second conduits 86 and 90, first and second orifices 92 and 94 are respectively installed, and thereby first and second nozzles 96 and 98 for jetting turbulent straight flows A1 and A2 are formed in the first and second conduits 86 and 90. Here, in the present embodiment, an example is described for the configuration in which a first solution L1 is sprouted from the first nozzle 96 and a second solution L2 is sprouted from the second nozzle 98, but the example may have the reversed configuration.

In addition, a jacket 100 is wound around the periphery of a mixing vessel 84 to control a mixture reaction temperature of first and second solutions L1 and L2 in a mixing vessel 84, as having been described in FIG. 11.

Furthermore, the two counter-jets type has the similar cylindrical diameter D1 of a mixing chamber 82, the similar orifice diameter D2 of a first nozzle 96, the similar orifice diameter D3 of a second nozzle 98, and the similar dimension relations thereof to the one-jet type; and has a similar method for forming first and second orifices 92 and 94, and material of an orifice material 102 and a compressing device to those described in the one-jet type. The shapes of the straight flows A1 and A2, as have been described in the one-jet type, can be formed into each shape of a sprouting flow of a filar shape, a cone shape, a slit shape and a deltaic shape.

Then, as shown in FIG. 20, first and second solutions L1 and L2 are sprouted in the form of a jet flow with a high pressure of 1 MPa or higher from both one end and the other end of a mixing chamber 82, through first and second nozzles 96 and 98, and are collided as counter turbulent straight flows A1 and A2 in the mixing chamber 82. By overlapping two eddy viscosities C and D formed by two straight flows A1 and A2, the solutions L1 and L2 are instantly mixed under an appropriate mixture reaction temperature condition, and the reacted reaction liquid LM is immediately discharged from an exhaust pipe 88. Thereby, metal microparticles having fine sizes and adequate monodispersibility can be formed.

A mixture reaction acquires a high mixing efficiency, when the positions to obtain maximum eddy viscosities C and D formed in a mixing chamber 82 by respective two high-speed turbulent straight counter-flows A1 and A2, are overlapped so as to make the eddy viscosity at an area E as large as possible. In other words, it is preferable that the straight flows A1 and A2 do not collide with each other right after being sprouted into the mixing chamber 82, but collide at the position where the two eddy viscosities C and D formed in the mixing chamber 82 by the straight flows A1 and A2 make the eddy viscosity at the overlapped area E as large as possible. For this purpose, it is preferable to adequately set a separation distance L (see FIG. 19) between the facing first and second nozzles 96 and 98, or in other words, a length of a mixing field. Thus, adequate setting for the separation distance L between the first and second nozzles 96 and 98, can make the area E reliably large where the maximized eddy viscosities C and D are mutually overlapped, and besides the two eddy viscosities C and D can be almost completely overlapped with each other. For this purpose, it is necessary to know the position at which the eddy viscosities C and D are maximized, and the position at which the eddy viscosities C and D are maximized in the mixing chamber 82 can be previously simulated with the use of a numerical analysis software RFLOW made by Rflow Co., Ltd., which has been already on the market as the flow analysis software in Japan. Then, a distance between the first nozzle 96 and the eddy viscosity C, and a distance between the second nozzle 98 and the eddy viscosity D can be grasped. As for the above position, as can be seen from FIG. 20, the positions for obtaining maxim eddy viscosities C and D are not pinpoints but have areas. Accordingly, the separation distance L between the first nozzle 96 and the second nozzle 98 is desirably determined as a total value of a distance between the first nozzle 96 and a point P1 and a distance between the second nozzle 98 and a point P2 when the point P1 is matched with the point P2, where the points P1 and P2 are defined as the positions of the approximately central parts in the obtained maximum eddy viscosities C and D. In addition, as for another method for grasping the points P1 and P2, there is an analysis method with the use of the above described numerical analysis software. According to the analysis, the points P1 and P2 for allowing the eddy viscosities C and D maximized by straight flows A1 and A2 have a relation with the flow rates of the straight slows A1 and A2, and approximately match the positions for allowing the flow rates of the straight flows A1 and A2 lowered to 1/10 of the maximum flow rates (normally flow rates of the first or second nozzle positions). Accordingly, by calculating such positions as to allow the flow rates of the straight flows A1 and A2 lowered to 1/10 of the maximum flow rates, the points P1 and P2 may be grasped. Thus, overlapping of the eddy viscosities C and D at the positions of allowing the eddy viscosities C and D maximized, has an effect of improving a mixture reaction performance through increasing a contacting efficiency on a liquid-liquid interface of the straight flows A1 and A2, and besides, exerts the effect of controlling the heat generation caused by liquid-liquid friction due to the collision of the straight flows A1 with the straight flow A2.

The above described apparatus 10 for producing metal microparticles incorporates such a gas-liquid separation unit 16 according to the present invention on the way of pipe 14 for making a reaction liquid LM flow therein that a byproduct gas generated by a reaction changes into bubbles, moves upward in a reaction liquid and is continuously released from a gas-liquid interface 119 in a gas-liquid separation pipe 118 into a headspace part 116. While the gas is removed in the gas-liquid separation pipe 118, the pressure of the headspace part 116 is controlled so as to be constant by a pressure adjustment device 120, and consequently the flow of the reaction liquid LM does not become unstable in the pipes 14 in front and in the rear of the gas-liquid separation pipe 118.

After all, a gas-liquid separation unit 16 according to the present invention is suitable for degassing in a flow reaction process which performs such a reaction as to generate a byproduct gas while a reaction liquid LM flows, and particularly for the process of continuously producing metal microparticles contained in a magnetic layer of a magnetic recording medium. Because when the gas-liquid separation unit 16 according to the present invention is employed in the process, the reaction accompanied by the generation of a byproduct gas can be so uniformized that the monodispersibility of the produced metal microparticles can be improved. In addition, because it is considered that the equilibrium of the reaction moves to a reaction acceleration side by continuous degassing, it improves the reactivity, enables a prompt reaction, and consequently can minimize the sizes of metal microparticles. In addition, in the case of controlling a solution temperature for the reaction, the gas-liquid separation unit 16 can effectively remove the byproduct gas in the flow of continuous treatment, thereby improves control accuracy for a solution temperature, and consequently reduces the size of the produced microparticles and improves the monodispersibility thereof.

Furthermore, when the production process of metal microparticles incorporates a gas-liquid separation unit 16 according to the present invention therein, it can reliably continuously produce the metal microparticles, and as a result, it can eliminate batch-to-batch variations in the quality of metal microparticles which occur in a conventional batch-type production process. Thereby, the metal microparticles having small particle sizes, adequate dispersibility and a constant quality, can be stably produced. In addition, the gas-liquid separation unit 16 enables a reaction to be conducted in a flow of a continuous process, and can use the whole pipe 14 for allowing a reaction liquid LM to flow as a temperature control line for controlling a reaction temperature, to make the reaction temperature control easy compared to the reaction in a conventional batch-type process.

When the reaction in an apparatus for continuously producing metal microparticles according to the present invention is anaerobic, the apparatus may have purging devices for sending an inert gas such as nitrogen (N2) installed in first and second preparation tanks 22 and 24 and a recovery tank 23 as well.

EMBODIMENTS

Embodiment 1

In a nitrogen gas of high purity, the operation described below is carried out.

Into the aqueous solution of a reducing agent having 0.50 g of $NaBH_4$ (made by Wako Pure Chemical Industries, Ltd.) dissolved in 16 ml of $H_2O$ (previously deoxygenated into 0.1 mg/l or less of dissolved oxygen), an alkane solution having aerosol 10.8 g of OT (made by Wako Pure Chemical Industries, Ltd.) mixed with 80 ml of decane (made by Wako Pure Chemical Industries, Ltd.) and 2 ml of oleylamine (made by Tokyo Kasei Kogyo Co., Ltd.) was added and mixed to prepare a reversed micelle solution which is a first solution L1.

Into a metal salt aqueous solution containing 60 g of iron(III) triammonium trioxalate trihydrate $(Fe(NH_4)_3(C_2O_4)_3)$ (made by Wako Pure Chemical Industries, Ltd.) and 0.50 g of potassium chloroplatinate $(K_2PtCl_4)$ (made by Wako Pure Chemical Industries, Ltd.) dissolved in 8 ml of $H_2O$ (previously deoxygenated into 0.1 mg/l or less of dissolved oxygen), an alkane solution containing aerosol 7.0 g of OT (made by Wako Pure Chemical Industries, Ltd.) mixed with 40 ml of decane (made by Wako Pure Chemical Industries, Ltd.) was added and mixed to prepare a reversed micelle solution which is a second solution L2.

In a conventional method for producing metal microparticles, the above described two reversed micelle solutions (L1 and L2) were blended and stirred for 10 minutes to react in one oil tank by a batch processing system. The metal microparticle obtained thereby is called a conventional method sample.

In contrast to this, in a method for continuously producing metal microparticles with the use of the incorporated gas-liquid separation unit 16 according to the present invention, a reversed micelle solution (L1) and a reversed micelle solution (L2) were instantly mixed with the use of any one of mixing units 12 in FIGS. 6 to 20. The reaction liquid LM was taken out from the mixing unit 12 simultaneously with the end of mixing, was passed in a gas-liquid separation unit 16 where a byproduct gas was removed, and in 10 minutes, was collected into a recovery tank 23. The metal microparticle obtained thereby is called a present invention method sample.

The operations described below are common in a conventional method and a method according to the present invention. Specifically, both of a conventional method sample and a present invention method sample were then heated to 50° C. and were aged for 60 minutes while being stirred by a magnetic stirrer; and to the solution, subsequently, 2 ml of oleic acid (made by Wako Pure Chemical Industries, Ltd.) was added; and the resultant solution was mixed and cooled to a room temperature, and then was taken out into the atmosphere. In order to disrupt the reversed micelle state, the mixed liquid of 100 ml of $H_2O$ (previously deoxygenated into 0.1 mg/l or less of dissolved oxygen) with 100 ml of methanol was added to the above solution to separate it into a water phase and an oil phase. In the oil phase, metal nanoparticles in a dispersed state were obtained. The oil phase was washed five times with a mixed liquid of 600 ml of $H_2O$ (previously deoxygenated into 0.1 mg/l or less of dissolved oxygen) and 200 ml of methanol. Then, 1,100 ml of methanol was added to flocculate and settle the metal nanoparticles. The supernatant liquid was removed, 20 ml of heptane (made by Wako Pure Chemical Industries, Ltd.) was added to redisperse the metal nanoparticles, and 100 ml of methanol was added to sediment the metal nanoparticles. The treatment was repeated three times, and finally 5 ml of octane (made by Wako Pure Chemical Industries, Ltd.) was added to obtain a dispersion containing metal nanoparticles of FePt dispersed in a liquid having a mass ratio (water/surface active agent) of water to a surface active agent in the value of 2.

The metal nanoparticles obtained by a conventional method and a method according to the present invention were subjected to the measurement of its yield, its composition, its volume, its average particle diameter and particle size distribution (coefficient of variation), and its coercive force. Here, the composition and the yield were measured with ICP spectrochemical analysis (inductively coupled plasma atomic emission spectrochemical analysis), and the volume, the average particle diameter and the particle size distribution were determined by statistically processing the values obtained through measuring the particle diameters of the particles photographed with a TEM. In addition, the coercive force was measured with the use of a high-sensitive magnetization vector measuring instrument made by Toei Industry CO., LTD, and a data processing unit made by the same company in the condition of an applied magnetic field of 790 kA/m (10 kOe). The metal nanoparticles were prepared and used for the measurement, by means of collecting the metal nanoparticles from a prepared dispersion containing the metal nanoparticles, thoroughly drying them and heating them at 550° C. for 30 minutes in an electric furnace.

The measured results of the metal nanoparticles obtained in the embodiment 1 by a conventional method and a method according to the present invention are shown in Table 1.

TABLE 1

| | Metal nanoparticles by a conventional method | Metal nanoparticles by a method according to the present invention |
|---|---|---|
| Yield | 85% | 85% |
| Composition | FePt = 69.5/30.5 | FePt = 55.5/44.5 |
| Volume average particle diameter | 5.0 nm | 4.2 nm |
| Particle size distribution (coefficient of variation) | 10% | 5% |
| Coercive force | 576.7 kA/m | 576.7 kA/m |

As seen from results in Table 1, the metal nanoparticles obtained by a method according to the present invention showed smaller sizes and superior monodispersibility, compared to those of the metal nanoparticles obtained by a conventional method. In addition, as for the composition, a method according to the present invention provided a higher percentage of a Pt content than a conventional method did.

Embodiment 2

Except that the amount of $H_2O$ (previously deoxygenated into 0.1 mg/l or less of dissolved oxygen) in a first solution L1 of a reversed micelle solution was made to be 40 ml and the amount of $H_2O$ (previously deoxygenated into 0.1 mg/l or less of dissolved oxygen) in the second solution L2 of a reversed micelle solution was made to be 20 ml, the same operation was conducted as in the embodiment 1, to obtain a dispersion containing metal nanoparticles of FePt dispersed in a liquid having a mass ratio (water/surface active agent) of water to a surface active agent in the value of 5.

The metal nanoparticles obtained by a conventional method and a method according to the present invention were subjected to the same measurement as in the embodiment 1, of the yield, the composition, the volume, the average particle diameter and particle size distribution (coefficient of variation), and the coercive force. These measuring methods are the same methods as used in the embodiment 1.

The measured results of the metal nanoparticles obtained in the embodiment 2 by a conventional method and a method according to the present invention are shown in Table 2.

TABLE 2

|  | Metal nanoparticles by a conventional method | Metal nanoparticles by a method according to the present invention |
| --- | --- | --- |
| Yield | 88% | 88% |
| Composition | FePt = 70.0/30.0 | FePt = 55.0/45.0 |
| Volume average particle diameter | 8.0 nm | 5.8 nm |
| Particle size distribution (coefficient of variation) | 10% | 4% |
| Coercive force | 521.4 kA/m | 521.4 kA/m |

As is seen from results in Table 2, when the mass ratio (water/surface active agent) of water to a surface active agent was made to 5, the metal nanoparticles obtained by a method according to the present invention showed smaller sizes and superior monodispersibility, compared to those of the metal nanoparticles obtained by a conventional method. In addition, as for the composition, a method according to the present invention provided a higher percentage of a Pt content than a conventional method did.

Embodiment 3

Except that the amount of $H_2O$ (previously deoxygenated into 0.1 mg/l or less of dissolved oxygen) in the first solution L1 of a reversed micelle solution was made to be 64 ml and the amount of $H_2O$ (previously deoxygenated into 0.1 mg/l or less of dissolved oxygen) in the second solution L2 of a reversed micelle solution was made to be 32 ml, the same operation was conducted as in the embodiment 1, to obtain a dispersion containing metal nanoparticles of FePt dispersed in a liquid having a mass ratio (water/surface active agent) of water to a surface active agent in the value of 8.

The metal nanoparticles obtained by a conventional method and a method according to the present invention were subjected to the same measurement as in the embodiment 1, of the yield, the composition, the volume, the average particle diameter and particle size distribution (coefficient of variation), and the coercive force. These measuring methods are the same methods as used in the embodiment 1.

The measured results of the metal nanoparticles obtained in the embodiment 3 by a conventional method and a method according to the present invention are shown in Table 3.

TABLE 3

|  | Metal nanoparticles by a conventional method | Metal nanoparticles by a method according to the present invention |
| --- | --- | --- |
| Yield | 82% | 82% |
| Composition | FePt = 69.5/30.5 | FePt = 55.2/44.8 |
| Volume average particle diameter | 10.0 nm | 7.6 nm |
| Particle size distribution (coefficient of variation) | 10% | 4% |
| Coercive force | 417.8 kA/m | 417.8 kA/m |

As is seen from results in Table 3, when the mass ratio (water/surface active agent) of water to a surface active agent was made to 8 as well, the metal nanoparticles obtained by a method according to the present invention showed smaller sizes and superior monodispersibility, compared to those of the metal nanoparticles obtained by a conventional method. In addition, as for the composition, a method according to the present invention provided a higher percentage of a Pt content than a conventional method did.

What is claimed is:

1. A gas-liquid separation method for continuously removing a byproduct gas generated by a reaction from a reaction liquid, comprising:
   providing a gas-liquid separation structure on the way of a pipe for passing the reaction liquid therein, the gas liquid separation structure having a larger space than the pipe in terms of a volume per unit length;
   floating the byproduct gas contained in the reaction liquid into a headspace part above a gas-liquid interface to separate the byproduct gas, the headspace part being formed when the reaction liquid passes through the gas-liquid separation structure; and
   controlling the pressure of the headspace part so that the pressure of the headspace part can be constant.

2. The gas-liquid separation method according to claim 1, wherein the pressure of the headspace part is controlled so that the cross sectional area of the reaction liquid flowing through the gas-liquid separation structure can be substantially equal to the cross sectional area of the reaction liquid flowing through the pipe.

3. The gas-liquid separation method according to claim 1, wherein air in the gas-liquid separation structure is previously purged by an inert gas.

4. The gas-liquid separation method according to claim 2, wherein air in the gas-liquid separation structure is previously purged by an inert gas.

5. The gas-liquid separation method according to claim 1, wherein the reaction of generating the byproduct gas is a reaction for forming metal microparticles by mixing a first solution containing a reducing agent with a second solution containing two or more metal ions selected from the group consisting of families 8, 9 and 10 in the periodic table.

6. The gas-liquid separation method according to claim 2, wherein the reaction of generating the byproduct gas is a reaction for forming metal microparticles by mixing a first solution containing a reducing agent with a second solution containing two or more metal ions selected from the group consisting of families 8, 9 and 10 in the periodic table.

7. The gas-liquid separation method according to claim 3, wherein the reaction of generating the byproduct gas is a reaction for forming metal microparticles by mixing a first solution containing a reducing agent with a second solution containing two or more metal ions selected from the group consisting of families 8, 9 and 10 in the periodic table.

8. The gas-liquid separation method according to claim 4, wherein the reaction of generating the byproduct gas is a reaction for forming metal microparticles by mixing a first solution containing a reducing agent with a second solution containing two or more metal ions selected from the group consisting of families 8, 9 and 10 in the periodic table.

9. A gas-liquid separation unit for continuously removing a byproduct gas generated by a reaction from a reaction liquid, comprising:
- a gas-liquid separation structure connected to the midway of a pipe for passing through the reaction liquid, the gas-liquid separation structure having a larger space than the pipe in terms of a volume per unit length and having a gas-liquid interface that is formed when the reaction liquid passes through the space;
- a headspace part above the gas-liquid interface; and
- a pressure adjustment device for adjusting the pressure of the headspace part above the gas-liquid interface, the adjustment device comprises a pressure sensor, a vent pipe with a valve, and a control part,
- wherein the byproduct gas contained in the reaction liquid is floated into the headspace part and continuously separated from the reaction liquid, while the reaction liquid passes through the gas-liquid separation structure, and
- wherein the pressure of the headspace part is constant as a result of the pressure adjustment device controlling the pressure of the headspace part.

10. The gas-liquid separation unit according to claim 9, wherein the gas-liquid separation structure has 1.5 times or larger volume per unit length than the volume per unit length of the pipe connected to the gas-liquid separation structure.

11. A gas-liquid separation unit for continuously removing a byproduct gas generated by a reaction from a reaction liquid, comprising:
- a gas-liquid separation structure connected to the midway of a pipe for passing through the reaction liquid, the gas-liquid separation structure having a larger space than the pipe in terms of a volume per unit length and having a gas-liquid interface that is formed when the reaction liquid passes through the space; and
- a pressure adjustment device for adjusting the pressure of a headspace part above the gas-liquid interface,
- wherein the byproduct gas contained in the reaction liquid is floated into the headspace part and continuously separated from the reaction liquid, while the reaction liquid passes through the gas-liquid separation structure, and
- wherein the pressure adjustment device comprises a pressure sensor for measuring the pressure of the headspace part, a vent pipe with a valve for exhausting the byproduct gas accumulated in the headspace part, and a control part for opening and closing the valve on the basis of a measured value by the pressure sensor, and the valve is opened or closed at a response speed of 10 milliseconds or shorter.

12. The gas-liquid separation unit according to claim 10, wherein the pressure adjustment device comprises a pressure sensor for measuring the pressure of the headspace part, a vent pipe with a valve for exhausting the byproduct gas accumulated in the headspace part, and a control part for opening and closing the valve on the basis of a measured value by the pressure sensor, and the valve is opened or closed at a response speed of 10 milliseconds or shorter.

13. A gas-liquid separation unit for continuously removing a byproduct gas generated by a reaction from a reaction liquid, comprising:
- a gas-liquid separation structure connected to the midway of a pipe for passing through the reaction liquid, the gas-liquid separation structure having a larger space than the pipe in terms of a volume per unit length and having a gas-liquid interface that is formed when the reaction liquid passes through the space; and
- a pressure adjustment device for adjusting the pressure of a headspace part above the gas-liquid interface,
- wherein the byproduct gas contained in the reaction liquid is floated into the headspace part and continuously separated from the reaction liquid, while the reaction liquid passes through the gas-liquid separation structure, and
- wherein the pressure adjustment device comprises a pressure sensor for measuring the pressure of the headspace part, a vent pipe with a valve for exhausting the byproduct gas accumulated in the headspace part, and a control part for opening and closing the valve on the basis of measured values by the pressure sensor, and the vent pipe has a resistor for decreasing a discharge rate of the byproduct gas, the resistor being installed in the vent pipe.

14. The gas-liquid separation unit according to claim 10, wherein the pressure adjustment device comprises a pressure sensor for measuring the pressure of the headspace part, a vent pipe with a valve for exhausting the byproduct gas accumulated in the headspace part, and a control part for opening and closing the valve on the basis of measured values by the pressure sensor, and the vent pipe has a resistor for decreasing a discharge rate of the byproduct gas, the resistor being installed in the vent pipe.

15. A gas-liquid separation unit for continuously removing a byproduct gas generated by a reaction from a reaction liquid, comprising:
- a gas-liquid separation structure connected to the midway of a pipe for passing through the reaction liquid, the gas-liquid separation structure having a larger space than the pipe in terms of a volume per unit length and having a gas-liquid interface that is formed when the reaction liquid passes through the space; and
- a pressure adjustment device for adjusting the pressure of a headspace part above the gas-liquid interface,
- wherein the byproduct gas contained in the reaction liquid is floated into the headspace part and continuously separated from the reaction liquid, while the reaction liquid passes through the gas-liquid separation structure, and
- wherein the gas-liquid separation unit further comprises a purging device for purging air with an inert gas installed in the gas liquid separation structure.

16. The gas-liquid separation unit according to claim 10, further comprising a purging device for purging air with an inert gas installed in the gas liquid separation structure.

17. The gas-liquid separation unit according to claim 11, further comprising a purging device for purging air with an inert gas installed in the gas liquid separation structure.

18. The gas-liquid separation unit according to claim 12, further comprising a purging device for purging air with an inert gas installed in the gas liquid separation structure.

19. The gas-liquid separation unit according to claim 13, further comprising a purging device for purging air with an inert gas installed in the gas liquid separation structure.

20. The gas-liquid separation unit according to claim 14, further comprising a purging device for purging air with an inert gas installed in the gas liquid separation structure.

* * * * *